US012751476B1

(12) United States Patent
Strobel et al.

(10) Patent No.: US 12,751,476 B1
(45) Date of Patent: Oct. 6, 2026

(54) METHODS OF PRODUCING TRUFFLE INFUSIONS

(71) Applicant: BLACK BOAR TRUFFLE, LLC, Bozeman, MT (US)

(72) Inventors: Gary A. Strobel, Bozeman, MT (US); Kelly W. Gaisford, Bozeman, MT (US)

(73) Assignee: Black Boar Truffle, LLC, Bozeman, MT (US)

(*) Notice: Subject to any disclaimer, the term of this patent is extended or adjusted under 35 U.S.C. 154(b) by 0 days.

(21) Appl. No.: 19/342,402

(22) Filed: Sep. 26, 2025

(51) Int. Cl.

| | |
|---|---|
| ***A23L 31/15*** | (2016.01) |
| ***A01G 18/20*** | (2018.01) |
| ***A01G 18/40*** | (2018.01) |
| ***A23L 7/104*** | (2016.01) |
| ***A23L 19/00*** | (2016.01) |
| ***A23L 25/00*** | (2016.01) |
| ***A23L 29/00*** | (2016.01) |

(52) U.S. Cl.
CPC .............. *A23L 31/15* (2016.08); *A01G 18/20* (2018.02); *A01G 18/40* (2018.02); *A23L 7/104* (2016.08); *A23L 19/03* (2016.08); *A23L 25/20* (2016.08); *A23L 25/40* (2016.08); *A23L 29/015* (2016.08)

(58) Field of Classification Search
CPC .......... A23L 31/15; A01F 18/20; A01F 18/40; A01G 18/20; A01G 18/40
See application file for complete search history.

(56) References Cited

U.S. PATENT DOCUMENTS

| | | | |
|---|---|---|---|
| 9,277,760 | B2 | 3/2016 | Splivallo |
| 12,365,867 | B2 | 7/2025 | Strobel |
| 2012/0100255 | A1 | 4/2012 | Splivallo |
| 2012/0180167 | A1 | 7/2012 | Usami |

(Continued)

FOREIGN PATENT DOCUMENTS

| | | | |
|---|---|---|---|
| JP | 2012143170 | A | 8/2012 |
| WO | 2020146650 | A1 | 7/2020 |

OTHER PUBLICATIONS

Naji, "Ecology and fungal physiology". Available online as of Feb. 25, 2020 from www.uomustansiriyah.edu.iq. pp. 1-24. (Year: 2020).*

(Continued)

*Primary Examiner* — Jenna A Watts
(74) *Attorney, Agent, or Firm* — FULLER IP LAW LLC; Scott H. Blackman

(57) ABSTRACT

Methods of producing truffle infusion using a pure culture of truffle fungus and using a pure culture of truffle fungus to produce a new flavor profile in food or an ingredient are disclosed. Also disclosed are truffle-growing composition and truffle-infused foods. The applicable truffle species include *Tuber melanosporum, Tuber magnatum, Tuber aestivum, Tuber uncinatum, Tuber borchii, Imaia* spp., *Tuber macrosporum, Tuber gibbosum, Tuber oregonense*, and *Tuber lyonii*. The truffle infusion is produced by incubating fruit, nut, grain, seed, or a portion thereof with the pure culture of truffle fungus. Fruit, nut, grain, seed that can be used to produce truffle powder, paste, or mash include rye, barley, lentil, wheat, rice, soybeans, pecan, hazelnut, pine nut, English walnut, coffee beans, mustard, cacao, sesame, sunflower, grapes, blackberries, blueberries, cherries, kiwi, mango, raspberries, and huckleberries.

16 Claims, 13 Drawing Sheets
(6 of 13 Drawing Sheet(s) Filed in Color)

Specification includes a Sequence Listing.

(56) References Cited

U.S. PATENT DOCUMENTS

| | | | | |
|---|---|---|---|---|
| 2017/0295837 | A1 | 10/2017 | Soni | |
| 2020/0163333 | A1 | 5/2020 | Gandhi | |
| 2024/0268430 | A1 * | 8/2024 | Kozubal | A23C 9/1203 |
| 2024/0327779 | A1 | 10/2024 | Strobel | |
| 2025/0304907 | A1 | 10/2025 | Strobel | |

OTHER PUBLICATIONS

"Tuber melanosporum". Available online as of 2026 from https://www.first-nature.com/fungi/tuber-melanosporum.php. pp. 1-5. (Year: 2026).*

Centre for Food Safety, Gov of Hong Kong. A kind of cheese with truffle suspected to be contaminated with Listeria monocytogenes. 2017.

Cirlincione, F., Francesca, N., Settanni, L., Donnini, D., Venturella, G., & Gargano, M. L. (2021). Microbial safety of black summer truffle collected from Sicily and Umbria Regions, Italy. Journal of food quality and hazards control.

Cullere, L. et al., Characterization of aroma active compounds in black truffles (*Tuber melansporum*) and summer truffles (*Tuber aestivum*) by gas chromatography-olfactometry, Food Chemistry 122, 2010, 300-306.

De Aza, C. et al., Fungal and bacterial communities in Tuber melanosporum plantations from northern Spain, Forests, 2022 13: 385.

GenBank: OQ372947.1, Geotrichum candidum isolate Gc_07 internal transcribed spacer 1, partial sequence; 5.8Sribosomal RNA gene and internal transcribed spacer 2, complete sequence; and largesubunit ribosomal RNA gene, partial sequence:, Retrieved from https://www.ncbi.nlm.nih.gov/nucleotide/OQ372947.1 ?report=genbank &log$=nuclalign&blast_rank=2&RID=5ZJWN773013, (Feb. 9, 2023).

Iotti, M. et al., Morphological and molecular characterization of mycelia of some *Tuber* species in pure culture, New Phytologist, 2002, 155: 499-505.

Lee, H., Nam, K., Zahra, Z., & Farooqi, M. Q. U. (2020). Potentials of truffles in nutritional and medicinal applications: A review. Fungal biology and biotechnology, 7(1), 9.

Mitchell, AM. et al., Volatile antimicrobials from Muscodor crispans, a novel endophytic fungus, Microbiology, 2010, 156: 270-277.

Mustafa, AM. et al., An overview of truffle aroma and main volatile compounds, Molecules, 2020, 25: 5948, https://doi org/10. 3390/molecules25245948.

Nowak, Z., Truffle: A Global History, Reaktion Books, 2015.

Rivera et al. "Selection of a decontamination treatment for fresh Tuber aestivum and Tuber melanosporum truffles packaged in modified atmospheres". Food Control, 2011, 22, pp. 626-632.

Sahab et al. Annals of Agricultural Science, 1984, vol. 29, No. 2, pp. 1069-1078.

Saxena, S. et al., Marvelous *Muscodor* spp.: update on their biology and applications, Microbial Ecology, 2021, 82: 5-20.

Strobel, G. A et al., Volatile antimicrobials from a Novel Endophytic Fungus, Microbiology, 2001, 147, 2943-2950.

Sun et al. "Increasing Production of Truffle Polysaccharides in the Solid-state Fermentation of Tuber melanosporum by Diosgenin Based on Orthogonal Matrix and Nonlinear Regression Analysis". Food Science and Technology Research, 2020, 26(4), pp. 487-494.

Urban, A et al., Molecular studies on terricolous microfungi reveal novel anamorphs of two *Tuber* species, My col. Res. 108 (7), 2004, 749-758.

Vahdatzadeh, M. et al., The Role of the Microbiome of Truffles in Aroma Formation: A Meta-Analysis Approach, Applied and Environmental Microbiology, 2015, 81: 6946-6952.

White, T.J., Amplification and Direct Sequencing of Fungal Ribosomal RNA Genes for Phylogenetics, PCR Protocols: A Guide to Methods and Applications, 1990, 315-322.

* cited by examiner

SEQUENCE LISTING

```
Sequence total quantity: 5
SEQ ID NO: 1           moltype = DNA  length = 507
FEATURE                Location/Qualifiers
source                 1..507
                       mol_type = genomic DNA
                       organism = Tuber melanosporum
SEQUENCE: 1
cctgtgacat acctattgtt gcttcggcgg gatcgccccg gcgccctcgg gcccggaccc  60
```

-continued

```
aggcgcccgc cggaggaccc aaactcttgt cttcatgaga atcttctgag taacacaagc  120
aaataaatta aaactttcaa caacggatct cttggttctg gcatcgatga agaacgcagc  180
gaaatgcgat aagtaatgtg aattgcagaa ttccgtgaat catcgaatct ttgaacgcac  240
attgcgcccg ccagtattct ggcgggcatg cctgttcgag cgtcatttca accctcaagc  300
ccccgggctt ggtgttgggg atcggccgcc ctccggcgcg ccggccccga aatctagtgg  360
cggtctcgct gtagcctcct ctgcgtagta acacacctcg caccggaacg cagcctggcc  420
acgccgttaa accccccact tctgaaggtt gacctcggat caggtaggaa tacccgctga  480
acttaagcat atcaataagc ggaggaa                                       507

SEQ ID NO: 2           moltype = DNA  length = 494
FEATURE                Location/Qualifiers
source                 1..494
                       mol_type = genomic DNA
                       organism = Tuber magnatum
SEQUENCE: 2
ccctgtgaca taccatattg ttgcctcggc ggtgcctgtt tcggcagccc gccagaggac  60
ccaaacccta gattacatta aagcattttc tgagtcaatg attaaatcaa tcaaaacttt  120
caacaacgga tctcttggtt ctggcatcga tgaagaacgc agcgaaatgc gataagtaat  180
gtgaattgca gaattcagtg aatcatcgaa tctttgaacg cacattgcgc ccgccagtat  240
tctggcgggc atgcctgtcc gagcgtcatt tcaaccctca agcccccggg cttggtgttg  300
gagatcggcg agccccccgg ggcgcgccgt ctcccaaata tagtggcggt cccgctgtag  360
cttcctctgc gtagtagcac acctcgcact gggaaacagc gtggccacgc cgtaaaaccc  420
cccacttctg aaaggttgac ctcggatcag gtaggaatac ccgctgaact taagcatatc  480
aataagcgga ggaa                                                     494

SEQ ID NO: 3           moltype = DNA  length = 324
FEATURE                Location/Qualifiers
source                 1..324
                       mol_type = genomic DNA
                       organism = Tuber aestivum
SEQUENCE: 3
gtganttaca cngcaacaat aattttatan tcaaaanacnn aaaataatca aaacttttaa  60
caatggatct cttggttctc gtatcgatga agaacgcagc gaaacgcgat atttcttgtg  120
aattgcagaa gtgaatcatc agtttttgaa cgcacattgc actttggggt atccccccaaa  180
gtatacttgt ttgagcgttg tttctctctt ggaattgcat tgcttttcta aaatttcgaa  240
tcaaattcgt ttgaaaaaca acactattca acctcagatc aagtaggatt acccgctgaa  300
cttaagcata tcaannngcg gagg                                          324

SEQ ID NO: 4           moltype = DNA  length = 482
FEATURE                Location/Qualifiers
source                 1..482
                       mol_type = genomic DNA
                       organism = Tuber uncinatum
SEQUENCE: 4
actatatcca tctacacctg tgaaccgttt gattgaatct tctgattcaa ttttacaaac  60
attgtgtaat gaacgtcatt agatcataac aaaaaaaaac ttttaacaac ggatctcttg  120
gctctcgcat cgatgaagaa cgcagcgaaa tgcgataagt aatgtgaatt gcagaattca  180
gtgaatcatc gaatctttga acgcaacttg cgctctctgg tattccggag agcatgcctg  240
tttgagtgtc atgaaatctc aaccattagg gtttcttaat ggcttggatt tggaggttgc  300
cattctaaat ggctcctctt aaaggagtta gcaagtttta ctattgctat ctggcgtaat  360
aagtttcgct ggaatggtat tgtgaagcgt gcttctaatc gtcttcggac aattactttg  420
actctggcct caaatcaggt aggactaccc gctgaactta agcatatcaa taagcggagg  480
aa                                                                  482

SEQ ID NO: 5           moltype = DNA  length = 313
FEATURE                Location/Qualifiers
source                 1..313
                       mol_type = genomic DNA
                       organism = Tuber borchii
SEQUENCE: 5
ttgtgattta ccacagcaac aaaaatcata caatcaaaac aaaaataatt aaaactttta  60
acaatggatc tcttggttct cgtatcgatg aagaacgcag cgaaacgcga tatttcttgt  120
gaattgcaga agtgaatcat cagtttttga acgcacattg cactttgggg tatcccccaa  180
agtatacttg tttgagcgtt gtttctctct tggaattgct ttgctcttct aaaatttcga  240
atcaaattcg tttgaaaaac aacactattc aacctcagat caagtaggat tacccgctga  300
acttaagcat atc                                                      313
```

METHODS OF PRODUCING TRUFFLE INFUSIONS

INCORPORATION-BY-REFERENCE OF MATERIAL ELECTRONICALLY FILED

Incorporated by reference in its entirety herein is a computer-readable nucleotide/amino acid sequence listing submitted concurrently herewith and identified as follows: One 7,221-byte XML file named "22630-004SeqList" created on Sep. 26, 2025.

TECHNICAL FIELD

This disclosure relates to methods of producing truffle-infused foods comprising cultivating truffle fungi in food or food ingredients

BACKGROUND

The fruiting bodies of the truffle fungi have been sought after for thousands of years and are prized for their flavor making them extremely expensive in all markets. Most commonly, they are collected in the soil surrounding certain tree species and certain dogs and trained pigs are used to locate the prized truffles. Once located, the truffle is then dug from the soil and shipped for commercial distribution. The truffle itself ranges from about 1 to 6-8 or more cm in diameter with a rough and undulating surface and can be used for the enhancement of flavor in all types of foods. Cultivation of the truffle has traditionally been done by dedicating land to certain tree types (usually oak species but others as well including pecan, and hazelnut) and then inoculating the roots of the trees being planted with harvested truffle material that carries spores and mycelial fragments that invade the young roots. Eventually the infected roots begin to support the growth of the fungus, which is attached to them, to produce a root enlargement that contains the truffle fungus, plant tissues and a plethora of soil related microbes. The fungal growth begins as a small ball of enlarged root growth eventually enlarging to the full-sized truffle. Full truffle development takes five to ten years. Establishing and maintaining a truffle forest not only requires the extra care to maintaining the forest, but the soil conditions also must be carefully controlled to ensure favorable conditions for truffle fungus growth. For example, the soil must have the appropriate moisture level (wet but not soggy), soil temperature (typically between 5° C. and 30° C. during the life of the fungus), and soil pH (7.5-8.5). Thus, not only is there be a great time investment for the conventional method of truffle farming, but a large financial investment is needed for controlling the soil condition to ensure the time investment will yield sufficient truffle production.

The long processes involved in truffle production and their short shelf life once dug from the soil, as well as the demand for the truffle itself as well as other truffled products, all add to the cost of this sought-after culinary delicacy. Given the multitude of costs and time involved in their procurement and production, prices for truffle and other truffle products tend to be expensive (for example, \$700-\$1000/lb. or more for black truffle, and \$3,000/lb. or more for white truffle).

Whereas truffle infusion of other food products could be a way of addressing the short shelf life and the expense of truffles to extend the time and the options in which one could experience the benefit of truffles and truffle flavor, the short life of truffles once dug from soil remains a problem for the truffle infusion process. Typically, the truffle aromatics only last three to five days in fresh truffles, but the infusion process takes two to three days. Accordingly, improved methods for farming truffles and producing truffle food products are needed improvements to the truffle market.

SUMMARY OF THE DISCLOSURE

Being able to isolate pure truffle fungi, for example as outlined in U.S. Pat. No. 12,365,867, now allows us to significantly increase the availability and varieties of foods and other products that can infused with truffle flavor and/or fragrance, and thus introduce new flavor profiles to the gastronomic community. The present disclosure is directed to methods and compositions related to truffle infusions using pure truffle fungi.

A method of making a truffle infusion is herein disclosed. The method comprises combining in a suitable container, such as a grow bag, a pure culture of ascomycetous fungus, with fruit, nut, grain, or a portion thereof and a peptone solution; incubating the combination for at least week to produce an inoculated botanical sample; heating the inoculated botanical sample to inactivate the fungus; and then processing the inactivated inoculated botanical sample into a food product. In certain aspects of the embodiment, the contents of the grow bag or other suitable container is adjusted to 5.0 to 7.4; and/or the incubation takes place at 19-21° C. for as much as three weeks or more; and/or the peptone solution comprises a simple sugar and optionally a yeast extract. In some aspects, the only simple sugar present is introduced only as part of the fruit in the mixture. In other aspects, the solution contains simple sugar, peptone, and yeast extract in a weight ratio of 5:1:2. In some aspects, after incubation, the inoculated botanical sample is heated to a temperature of at least 70° C. to inactivate the fungus.

In one aspect of the embodiment, the processing portion of the method comprises at least one of: grinding the inoculated botanical sample into a powder and creating a mash using the inoculated botanical sample. In another aspect of the present disclosure, the powder or mash is mixed with a food product. In some non-limiting examples of food products, the powder or mash is used to create salts, oils, dressings, spreads, and drinks.

In another aspect, a truffle-growing composition is herein disclosed. The composition includes a solution and comprises a grain or seed; a simple sugar; peptone, yeast extract; and a buffer. The buffer adjusts the pH of the composition to about 5.0-7.5. In some implementations, the buffer adjusts the pH of the composition to about 6.0 to 6.5 or to about 6.0. In some aspects, the buffer is a phosphate buffer, for example a potassium phosphate buffer. In certain embodiments, the composition comprises rye as the seed or grain and the buffer is potassium hydrogen phosphate. The amount of the buffer in such a composition is 2 grams for every 5 grams of the simple sugar, for example glucose.

In some aspects of the present disclosure, the ascomycetous fungus comprises a *Tuber* spp. and *Iamai* spp. In another aspect of the disclosure, the ascomycetous fungus is selected from a group consisting of: *Tuber melanosporum, Tuber magnatum, Tuber aestivum, Tuber uncinatum, Tuber borchii, Imaia* spp., *Tuber macrosporum, Tuber gibbosum, Tuber oregonense*, and *Tuber lyonii* (a/k/a *Tuber Texense*).

In some aspects of the present disclosure, the method is used to generate an new taste profile in food ingredient comprising sulfur-containing compounds, such as mustard, watercress, turnip, kohirabi, Brussels sprouts, garlic, onion, chive, leek, shallot, scallion, portions thereof, or combinations thereof.

In some aspects, the pH of the composition to be incubated is adjusted using a phosphate buffer, such as $KH_2PO_4$ and $K_2HPO_4$, such as at a molar ratio of 9:1.

The foregoing and other aspects, features, and advantages will be apparent from the DESCRIPTION and DRAWINGS, and from the CLAIMS if any are included.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1A is a drawing representation of synnemata of the fungus *Tuber melanosporum*. The spores are each about 3 microns in diameter. FIG. 1B is a drawing representation of a close up of conidiospore production on the synnemata of *T. melanosporum*. The spores are 3-4 microns in dia. FIG. 1C an image illustrating a scanning electron micrograph of a 6-week-old black truffle culture (*Tuber melanosporum*). The micrograph shows the synnemata consisting of two or more fructiferous conidiophores that are intertwined and producing conidiospores mostly along their entire length. The conidiospores bud randomly from the surface of the conidiophores (see inset with spore buds at the base of the large conidiophore). The spores average 2.5-3.0 μm in length and the buds are about 0.5 μm in diameter.

DETAILED DESCRIPTION

Figure 1A:
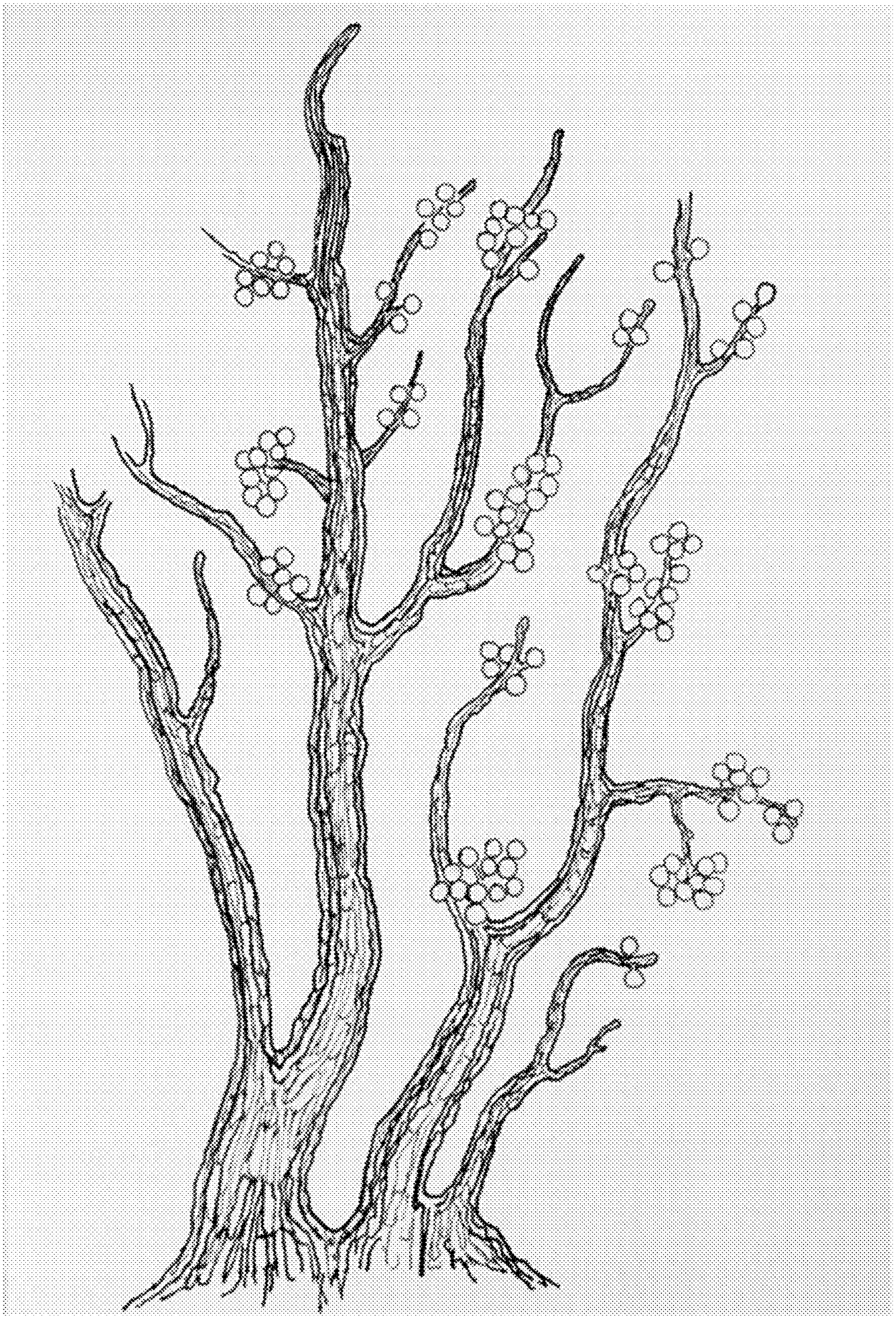
FIGS. 1A-1C are images illustrating the microscopic structure of the black truffle fungus.
Figure 1B:
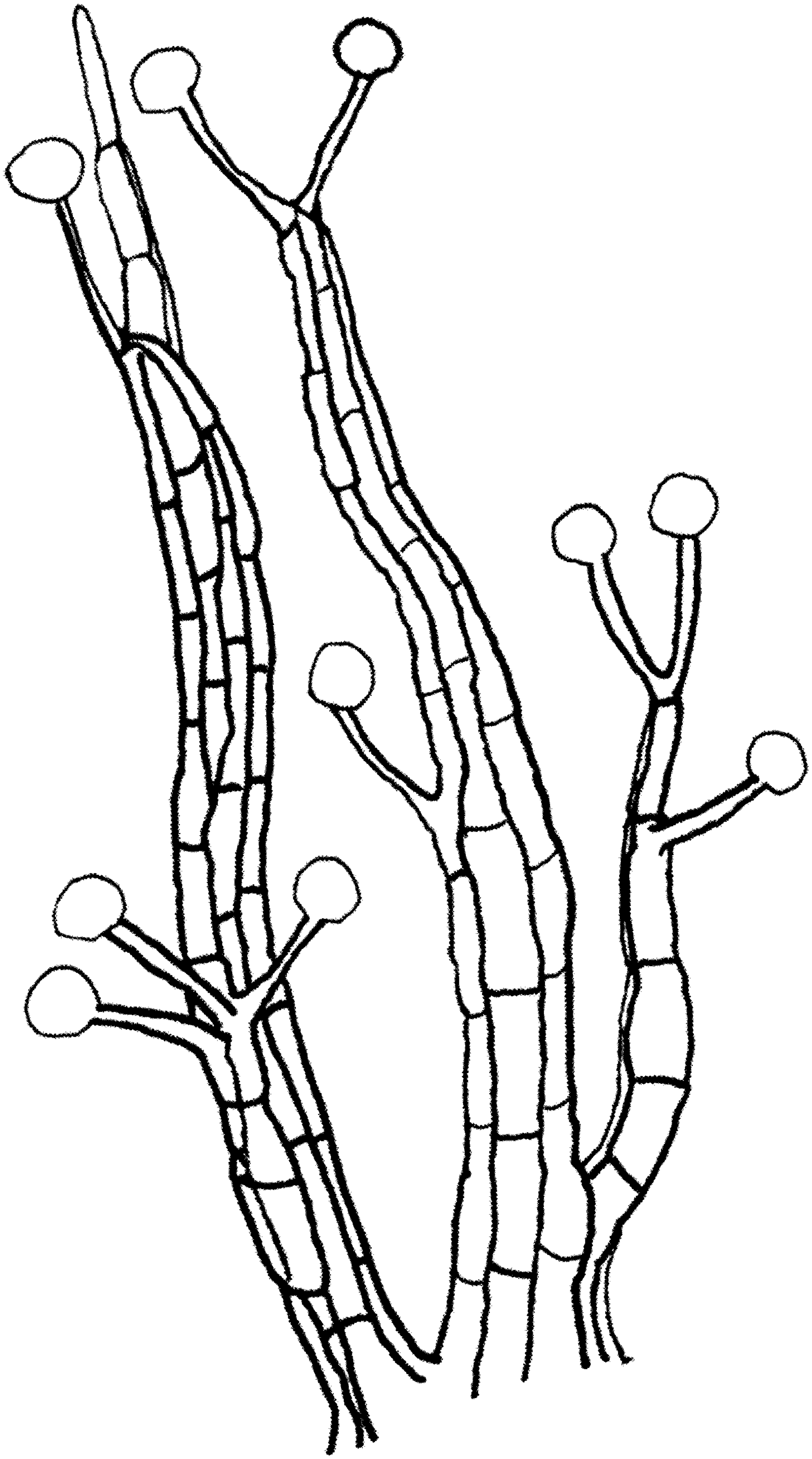
Figure 1C:
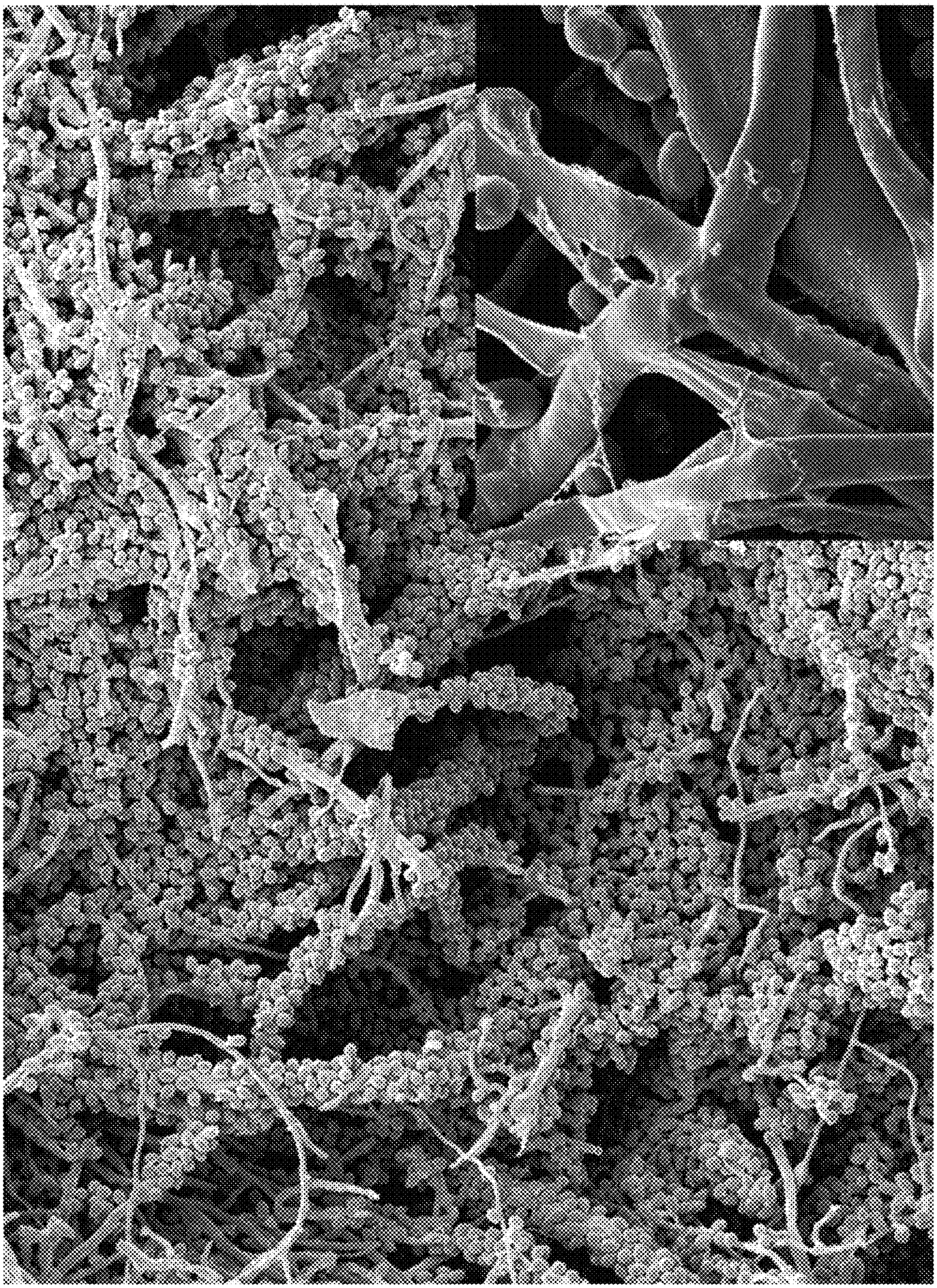

Detailed aspects and applications of the disclosure are described below in the following drawings and detailed description of the technology. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the disclosure. It will be understood, however, by those skilled in the relevant arts, that embodiments of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms “a,” “an,” and “the” include plural referents unless the context clearly dictates otherwise. Thus, for example, reference to “a step” includes reference to one or more of such steps.

The words “exemplary,” “example,” or various forms thereof are used herein to mean serving as an example, instance, or illustration. Any aspect or design described herein as “exemplary” or as an “example” is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented but have been omitted for purposes of brevity.

When a range of values is expressed, another embodiment includes from the one particular value and/or to the other particular value. Similarly, when values are expressed as approximations, by use of the antecedent “about,” it will be understood that the particular value forms another embodiment. All ranges are inclusive and combinable.

As used herein, the term “about” when used in the context of numeric values denotes an interval of accuracy that is familiar and acceptable to a person skilled in the art. The interval is ±10% of the given numeric value, ±5% of the given numeric value, or ±2% of the given numeric value, as is appropriate under the particular conditions and content.

Throughout the description and claims of this specification, the words “comprise” and “contain” and variations of the words, for example “comprising” and “comprises”, mean “including but not limited to”, and are not intended to (and do not) exclude other components.

As used herein, the term "food" refers to articles used for food or drink or chewing gum for humans or animals. Articles used for components of the aforementioned articles are also encompassed in the term "food".

As required, detailed embodiments of the present disclosure are included herein. It is to be understood that the disclosed embodiments are merely exemplary of the invention that may be embodied in various forms. Therefore, specific structural and functional details disclosed herein are not to be interpreted as limits, but merely as a basis for teaching one skilled in the art to employ the present invention. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, devices, methods, applications, conditions, or parameters described and/or shown herein, and that the terminology used herein is for the purpose of describing particular embodiments by way of example only and is not intended to be limiting of the claimed inventions. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

More specifically, this disclosure, its aspects and embodiments, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The present disclosure relates to uses of cultivated truffle cultures for producing truffle infusions. These method utilize a pure culture of truffle produced by isolating and culturing truffle fungi species that do not require the use of soil.

Truffles have been eaten and prized for thousands of years. They are found on the roots of certain tree species and are caused by a root overgrowth that is relatively soft, edible and about the size of a golf ball. The root is initially invaded by a particular microbe known broadly as a truffle fungus. There are many different truffle fungi each produces its own unique suite of compounds that lend taste and flavor to the truffle. Thus, because the truffle flavor is so unique and desirable they are highly prized, sometimes rare, and very expensive.

Truffles are typically found in the forests by trained dogs or female pigs and then cleaned and sold in the local or world's market. Chemical analyses of truffles in general reveal that they are a good source of proteins as well as ascorbic acid, ergosterol, phenolics, flavonoids, terpenoids, phytosterol, and polysaccharides. Their esters and unique sulfur containing compounds lead to their inviting fragrance and flavor. However, because they are in a soil environment and have a permeable outer layer, each truffle possesses its own microbiome—that is a mixture of millions of bacteria representing many bacterial species, mixed with various fungi, streptomycetes, sometimes insect larvae, and nematodes. The contaminants make isolation of a pure culture of a truffle fungus very difficult at best, if not impossible. For instance, all of the truffle fungi are relatively slow growing (i.e. 1-2 mm per day), but many of the fungi that contaminate the truffles are relatively rapidly growing (i.e. *Trichoderma* spp. at 18-20 mm per day). When the truffle is cooked, the presence of these pathogens may not be a problem, but when eaten raw, one risks getting sick. Thus, there are cases in which pathogenic bacteria have been found in truffles and in products made from them. For instance, the pathogenic bacterium *Listeria monocytogenes* has been found in cheese made with a truffle fungus. This contamination problem has been found in Canada, the United States and the United Kingdom. In other cases, the pathogenic bacteria *E. coli, Shigella* and *Salmonella* spp. have each been found in harvested truffle species.

One elusive solution to the problem of microbial contamination, and even to the rarity and expense of truffles, is to isolate the pure truffle fungi and grow them independently from the tree host in culture on various sterile natural substrates and make usable, desirable and novel edible products having the same tastes and flavors represented in the natural truffle but in a safer way, avoiding the typical microbial contaminants. There are many advantages in having each of the truffle fungi in pure culture which makes them available for use in a wide range of novel food related products, each holding a truffle fungal flavoring after growth of the truffle on a particular food product such as a grain or nut or fruit.

Contrary to conventional truffle infusion where the truffle aroma is infused into a food, the truffle infusions described herein can develop more complicated favor, as the pure truffle culture is itself incubated with the food or a food ingredient.

As noted above, the only available truffle products currently available anywhere are from natural sources involving the truffle itself. Normally, pieces of truffle or slices thereof are added to cuisine via freshly harvested or dried pieces of the harvested truffle itself. And that flavor is strictly limited in scope because the fungus had been growing and obtained from only one tree source. With the disclosed method and compositions, the substrates with which the fungus is grown influences the flavoring of the products made by the fungus as it modifies its hosts biochemical components. This unique feature of fungal fermentation has been taken advantage of to discover a plethora of novel potential food products that are listed here forth. Accordingly, also disclosed are food products such as beverages, spreads, salad dressing, seasoning, among many others, which are created by the truffle infusion. A method of generating a new taste profile in food or a component thereof is also described herein.

The method of making a truffle infusion comprises incubating a pure culture of ascomycetous fungus with a botanical source (for example, leaves and/or stems of a plant, root portion of a plant or fruit, nut, grain, seed, or a portion thereof) for at least two weeks to produce a truffle-infused product and processing the truffle-infused product into a truffle mash, paste, or powder. In some aspects, the truffle mash, paste, or powder is the truffle infusion. The truffle infusion could then be further processed for obtaining truffle extract. Such truffle extract is enhanced with biochemical components from the botanical source with which the pure culture of ascomycetous fungus is incubated. For example, if the botanical source is witchhazel or rose, the truffle extract may have added toning and astringent properties. If the botanical source is rosemary or green tea, the resulting truffle extract gains additional antiboxidants from the rosemary and tea aloe. In the case of aloe vera, calendular, or chamomile being the botanical source, the truffle infusion and extract would have moisturizing, soothing properties, and antinfimammatory properties.

In other aspects, the truffle mash, paste, or powder is mixed with a food or food product to produce a food product. In some non-limiting examples of food products, the powder or mash is used to create salts, oils, dressings, spreads, and drinks. The powder or mash can also be used to infuse honey and coffee. Example 6 provides non-limiting examples of the food products that enhanced with the truffle infusion described herein. The amount of truffle infusion (for example, truffle powder produced according to the method described herein) used to enhance food products vary from 0.5-1% by weight, 0.5-1.5% by weight, 1-10% by weight, or at a 8-9:1 weight ratio of the food product to the truffle infusion. In another aspect, the amount of truffle infusion (for example, truffle paste or truffle mash produced according to the method described herein) used to enhance food products vary from 1:1 volume ratio of truffle infusion to the food product, 1:2 volume ratio of truffle infusion to the food product, or 2-3 volume truffle infusion for 7-8 volume of food product.

In one implementation, the method of producing a truffle infusion comprises combining in a grow bag a pure culture of ascomycetous fungus with a nut, grain, seed, or a portion thereof with a solution, the solution comprising a simple sugar; peptone; and yeast extract; adjusting the pH of the contents of the grow bag to 5.0-7.5; incubating the grow bag at 19-21° C. for at least three weeks to produce a truffle-infused product; and then heating the truffle-infused product to inactivate the ascomycetous fungus thereby producing a truffle mash, paste, or powder. In some implementations, the grain or seed is selected from wheat, barley (hulled, pearled, or a special barley selections such as Ethiopian), rye, rice, and millet. In some implementations, the seed is selected from mustard seed, watercress seed, soybean, pea, a lentil, or coffee berry. In certain embodiments, the seed that is grown with the pure culture of ascomycetous fungus is selected from a legume. In some implementations, the nut is selected from pecan, hazelnut, walnut, pine nut, or other tree nut.

In another implementation, the method of producing a truffle infusion comprises combining a pure culture of ascomycetous fungus with fruit or a portion thereof with a solution, the solution comprising peptone and water to form a fermentation mixture; ensuring the pH of the fermentation mixture is 5.0-7.5; incubating the fermentation mixture at 19-21° C. for at least three weeks to produce a truffle-infused product; and then heating the truffle-infused product to inactivate the ascomycetous fungus thereby producing a truffle mash, paste, or powder. In some implementations, the fruit may be selected from grapes, blackberries, blueberries, cherries, kiwi, mango, raspberries, and huckleberries, or parts or combinations thereof.

The incubation period for producing the truffle infusion may be between three weeks and eight weeks, depending on the variety of the ascomycetous fungus used for the infusion process. In some aspects, the grow bag or the fermentation mixture is incubated at 20-20.5° C. to produce the truffle-infused product. Before and during the incubation period, the pH of the contents of the grow bag is preferably controlled to be between 6.0 and 6.5. In particular implementations, the pH of the contents of the grow bag is preferably adjusted to about 6.0, for example, a pH between 5.7 and 6.3 or 5.9 and 6.1.

In certain implementation, to prevent pathogens from contaminating the truffle-infused product, the solution in which the pure culture of ascomycetous fungus and the nut, grain, seed, or a portion thereof are combined is autoclaved. The step of combining in the pure culture of ascomycetous fungus and the nut, grain, seed, or a portion thereof with the solution in the grow bag is also performed under aseptic conditions.

The temperature to inactivate the ascomycetous fungus is at least 68° C. In some implementations, the ascomycetous fungus is inactivated by heating the truffle-infused product to a temperature ranging from about 68° C. to about 80° C., for example, between 70° C. and 75° C. In certain implementations, the ascomycetous fungus is inactivated by heating the truffle-infused product to a temperature of about 70° C. This inactivation process may stop when the truffle-infused product reaches the temperature ranging from about 68° C. to about 80° C., or in another aspect, the truffle-infused product is maintained at the temperature ranging from about 68° C. to about 80° C. to reduce the water content within the product to the desired level for producing the truffle mash, paste, or powder. In some implementations, this means the truffle-infused product is maintained at the temperature ranging from about 68° C. to about 80° C. for two to three days. In certain implementations, the truffle mash, paste, or powder undergoes a sterilization process to ensure the product is decontaminated from contaminant microorganisms after the heat inactivation step. The sterilization process can be any step routinely used in ensuring food safety without compromising the quality of the food product, for example autoclaving or x-ray irradiation.

The method of generating a new taste profile in food/ingredient is for the foods and ingredients comprising sulfur-containing compounds. Exemplary foods and ingredients that have sulfur-containing compounds are members of the Brassicaceae family (mustard seed, rapeseed, broccoli, watercress, rutabaga, turnip, and kohlrabi) and members of the Amaryllidaceae family (garlic, chive, leek, shallot, and onion), dairy products, preserved fruits (for example, figs, apricots, or peaches that are preserved with sulfur compounds), wine or cider. Food ingredient that are high in methionine, cysteine, thiamine, and biotin also can gain a new taste profile due to the described method. The method of generating a new taste profile in foods/ingredients comprising sulfur-containing compounds comprises combining in a grow bag a pure culture of ascomycetous fungus with the foods/ingredients comprising sulfur-containing compounds with a solution, incubating the grow bag at 19-21° C. for at least three weeks to produce a truffle-infused product.

In certain implementations, the method of generating a new taste profile in foods/ingredients is for the foods and ingredients comprising sulfur-containing compounds further comprises heating the truffle-infused product to inactivate the ascomycetous fungus thereby producing a truffle mash, paste, or powder. In some implementation, the step of combining in the pure culture of ascomycetous fungus and the food/ingredient with the solution in the grow bag is performed under aseptic conditions. In certain implementations, the truffle mash, paste, or powder undergoes a sterilization process to ensure the product is unsafely contaminated by microorganisms after the heat inactivation step.

The truffle-growing composition described herein is a liquid composition that comprise a grain or seed, a simple sugar, peptone, yeast extract, and a buffer. The buffer adjusts the pH of the composition to 5.0-7.5. In some embodiments, the buffer adjust the pH of the composition to 6.0-6.5 or about 6.0. Any phosphate buffer suitable for food production may be used, include potassium phosphate buffers. In particular embodiments, the buffer is potassium hydrogen phosphate. In some aspects, the amount of the buffer in the composition is adjusted based on the amount of simple sugar in the buffer. In certain embodiments, the amount of buffer is 2 g for every 5 g simple sugar. In a particular implementation, the truffle-growing composition comprises a weight ratio of the simple sugar, peptone, and yeast extract of 5:1:2, for example for every gram of peptone in the truffle-growing composition, there is 5 g glucose, and 2 g yeast extract. The volume of liquid for the aforementioned about of simple sugar, peptone, and yeast extract is between about 500 ml and 3 L of water. The amount of buffer depends on the total volume of water and the specific salt selected in order to adjust the pH of the truffle-growing composition to 5.0-7.5, to 6.0-6.5, or to about 6.0.

The methods and compositions described herein are applicable to all truffle species where a pure culture can obtained. The method of growing truffle comprises obtaining a spore-producing fruiting body of an ascomycetous fungus from soil, scraping the inside of the spore-producing fruiting body of the ascomycetous fungus to collect a fruiting body sample, placing the fruiting body sample on a first surface comprising a nutrient substrate, incubating the fruiting body sample on the nutrient substrate with an antimicrobial volatile mixture until mycelium formation, and transferring the new fungal growth into a second surface comprising the nutrient substrate to obtain a pure culture of the ascomycetous fungus. The presence of mycelium indicates new fungal growth. In some embodiments of the present disclosure, the nutrient substrate comprises: a simple sugar; a botanical isolate; and agar. In certain implementations the nutrient substrate further comprises at least one protein component, for example peptone and/or yeast extract. In some aspects, the botanical isolate is fruit, nut, grain, or a portion thereof. In particular implementations, the nutrient substrate that is potato dextrose agar. In other implementations, the nutrient substrate is pecan agar. In some embodiment of the method, the second nutrient substrate comprises a liquid. In some aspects, the nutrient substrate comprises potato dextrose. Specifics details for obtaining a pure culture of truffle are provided in International Application Number PCT/US2024/022240, the contents of which are incorporated by reference herein.

Truffle Species

Both white truffle and black truffle species can be used in the described methods and compositions. The species of truffle includes *Tuber* spp. and *Iamai* spp. For example, the disclosed method grows a species of ascomycetous fungus selected from the group consisting of: *Tuber melanosporum, Tuber magnatum, Tuber aestivum, Tuber uncinatum, Tuber borchii, Imaia* spp., *Tuber macrosporum, Tuber gibbosum, Tuber oregonense*, and *Tuber lyonii* syn. *Texense.*

Figure 2:
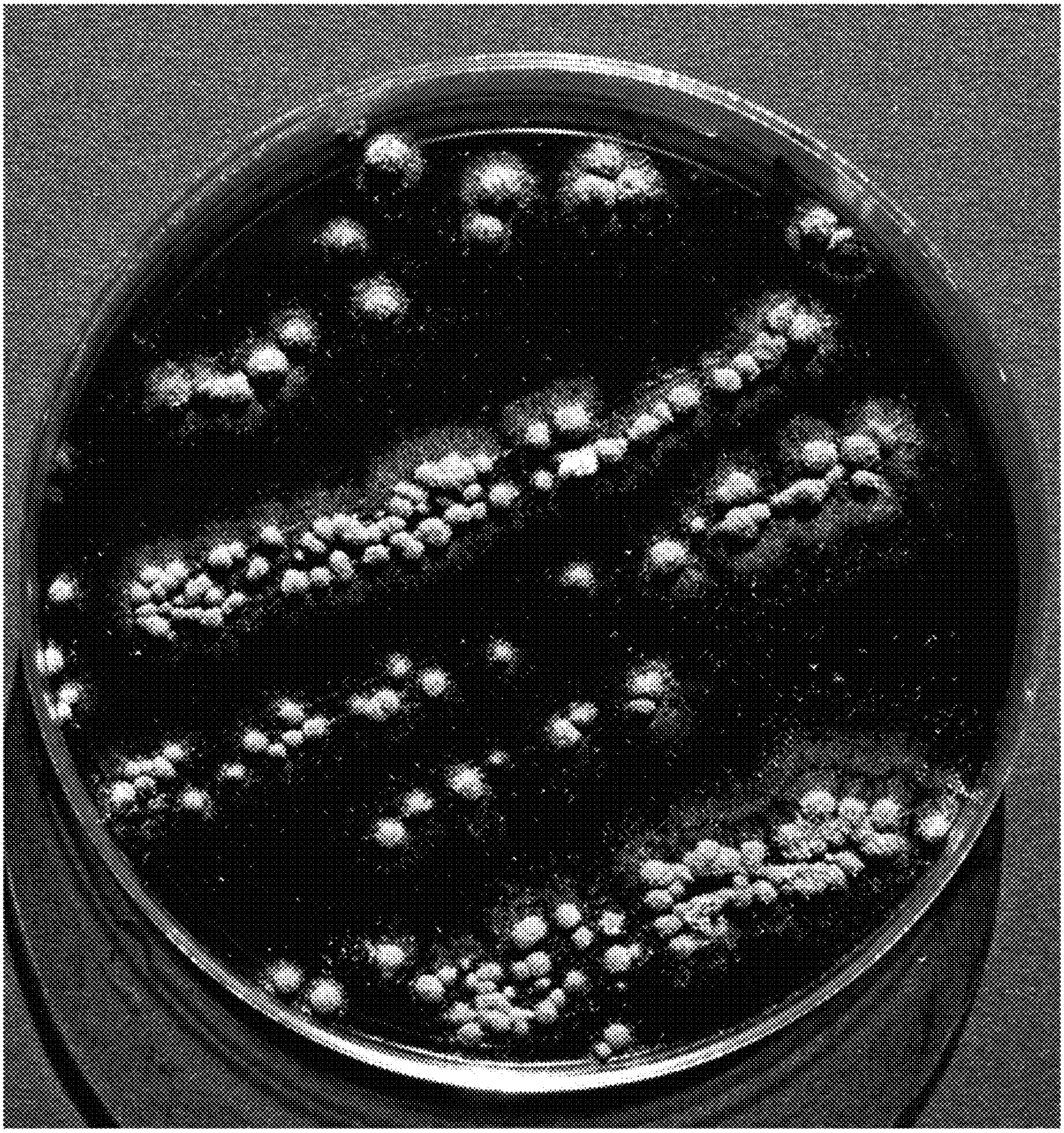
FIG. 2 is an image representation of the production of mini-truffles on PDA by the isolated culture of *T. melanosporum* that had been stored in honey for 6 days and then a small portion of the honey struck 5 times on a fresh plate of PDA and incubated for 10 months at 22° C. The dissected truffles had the same structures as a mature large field harvested truffle.

Briefly, some of the characteristics of isolated *Tuber melanosporum* or the black truffle are:

1. Relatively slow growth on PDA medium of 1 mm per day.
2. Production of slightly yellowish hyphae that become heavily interwoven.
3. Immediate production of fused hyphae into synnemata (fruiting structures).
4. Abundant production of conidiospores (conidia) on synnemata that are about 2.5μ in diameter (FIGS. 1A-1C and 2). Initially the spores are produced on the termini of branched conidiophores. Then on older synnemata they bud from the entire length of that structure (FIGS. 3,4).
5. Initial colony color is yellowish white eventually tuning gray then to black.
6. Older colonies turn grayish as a result of numerous synnemata and conidiophores and conidia (FIG. 3).
7. Definite truffle odor developing on the colonies. This odor is the result of the production of volatile organic compounds (VOCs) by the fungus. GC/MS analyses have been published for the black truffle as well as many of the other truffle fungi. The compounds identified by the standard SPME fiber analyses have revealed the presence of sulfur compounds, organic alcohols, acids, esters, aldehydes, ketones, as well as aromatic compounds, furans, terpenoids and others. It is to be remembered that all of the analyses published thus far in the literature were done on the intact truffle material and not on pure fungal cultures and that all truffles are made up of a huge complex mixture of microorganisms including bacteria, other fungal species, streptomycetes and even an occasional insect, not to mention plant tissue material on which the truffle forms. Thus, one would expect that a GC/MS analysis of a pure truffle culture would not be identical to that of the respective truffle type that it may produce since fungal products would and could be easily modified by the other microbes in the truffle tissues. This would yield a mixture of mostly bacterial and other fungal derived products. Nevertheless, GC/MS analyses of the VOCs of the black truffle culture did yield the following compounds that were common to published analyses of the black truffle itself including acetic acid, ethyl benzene, nonanal, decanal, ethyl benzene, 1,24 trimethyl benzene, and benzaldehyde. Most importantly was the detection of 3-thiophencarboxylic acid methyl ester. Thiophenes are known products of the truffle fungi. These products were found in samples obtained from 4- to 5-week-old cultures of the fungus having been grown on white rice as described below. Gases were sampled with the SPME fiber as well as solubilized gaseous compounds analyzed with the C8 solid phase extraction cartridge. The GC/MS data are supportive of the claim that the black truffle fungus has been successfully isolated. Obviously not all of the volatile compounds published for the black truffle were recovered here since the truffle represents a microbiome of many microbes and other organisms and they undoubtedly contribute to the complexity of the VOC composition, independently of the *Tuber* spp.
8. Eventual formation of mini-truffles on PDA plates. The fungus had been grown on sterile pecan fruits for 6 weeks and then placed in honey for 1 week. It was then struck on PDA and grown for a year on the plate where it produced mini-truffles (FIG. 2). Also, when a culture is transferred from PDA to the pecan agar, mini-truffle formation begins in about 6 weeks. This is, to our knowledge, the first report of such a discovery. It has major implications as another commercial product—that is artificially derived truffles.
9. The ITS sequence of the *T. melanosporum* is provided in SEQ ID NO: 1. It shares 99.8% identity with Cosmospora sp. but in no way is it identical to this fungus. Interestingly, in the literature, virtually all of the ITS sequences reported for the truffle fungi had their DNA extracted from the truffle itself which is composed of plant, other fungal and bacterial contaminants. Thus, one cannot obtain a valid determination of the actual ITS sequence in this manner. Only a pure fungal culture as a DNA source can yield accurate ITS sequence information as per above.

Figure 3:
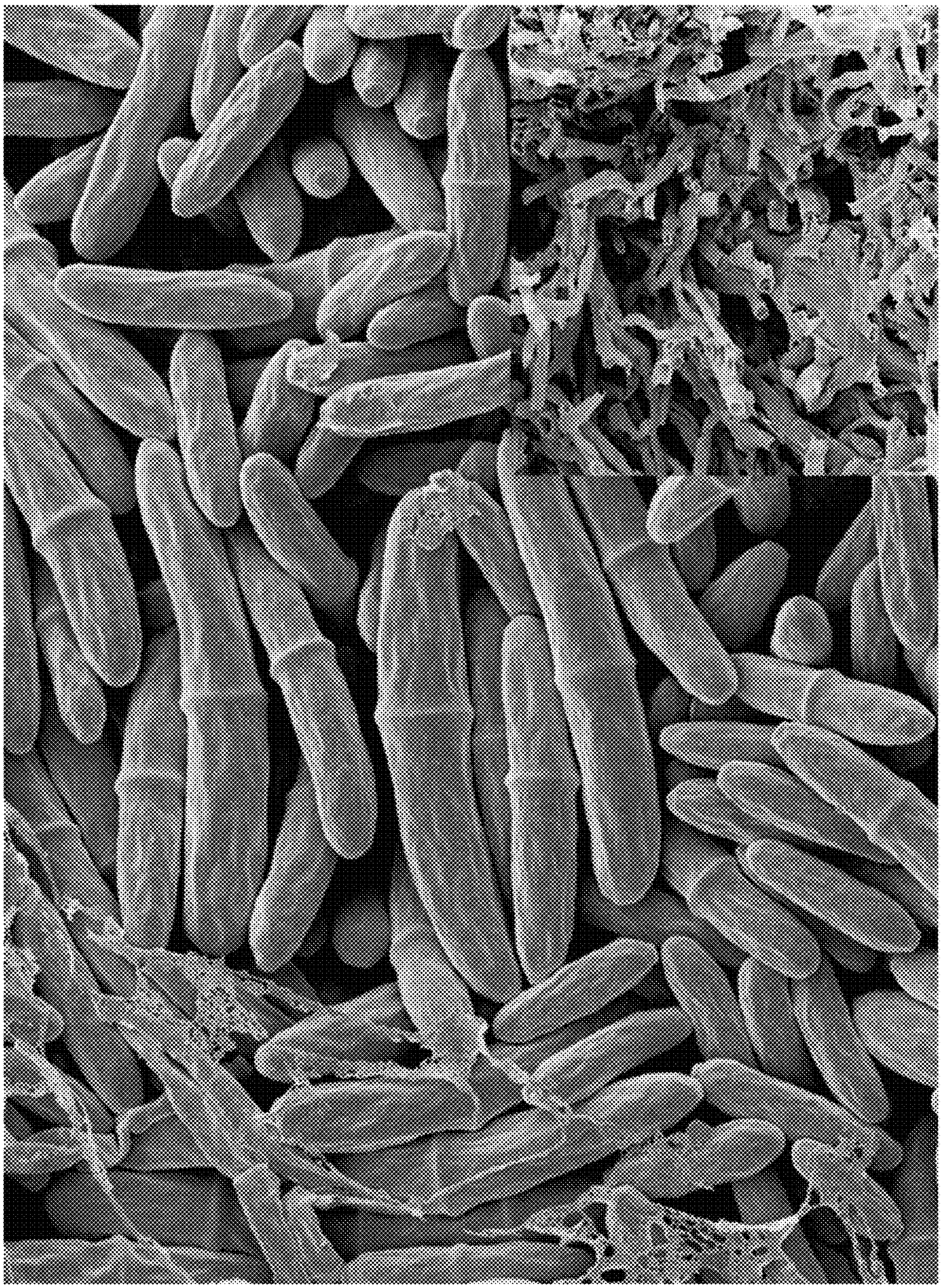
FIG. 3 is an image illustrating a scanning electron micrograph of conidiospores (conidia) of *T. magnatum* showing some as single celled (3.0 μm) and some larger ones as two celled-6.7 μm. The scarred conidiophore termini are shown in the insert.
Figure 4:
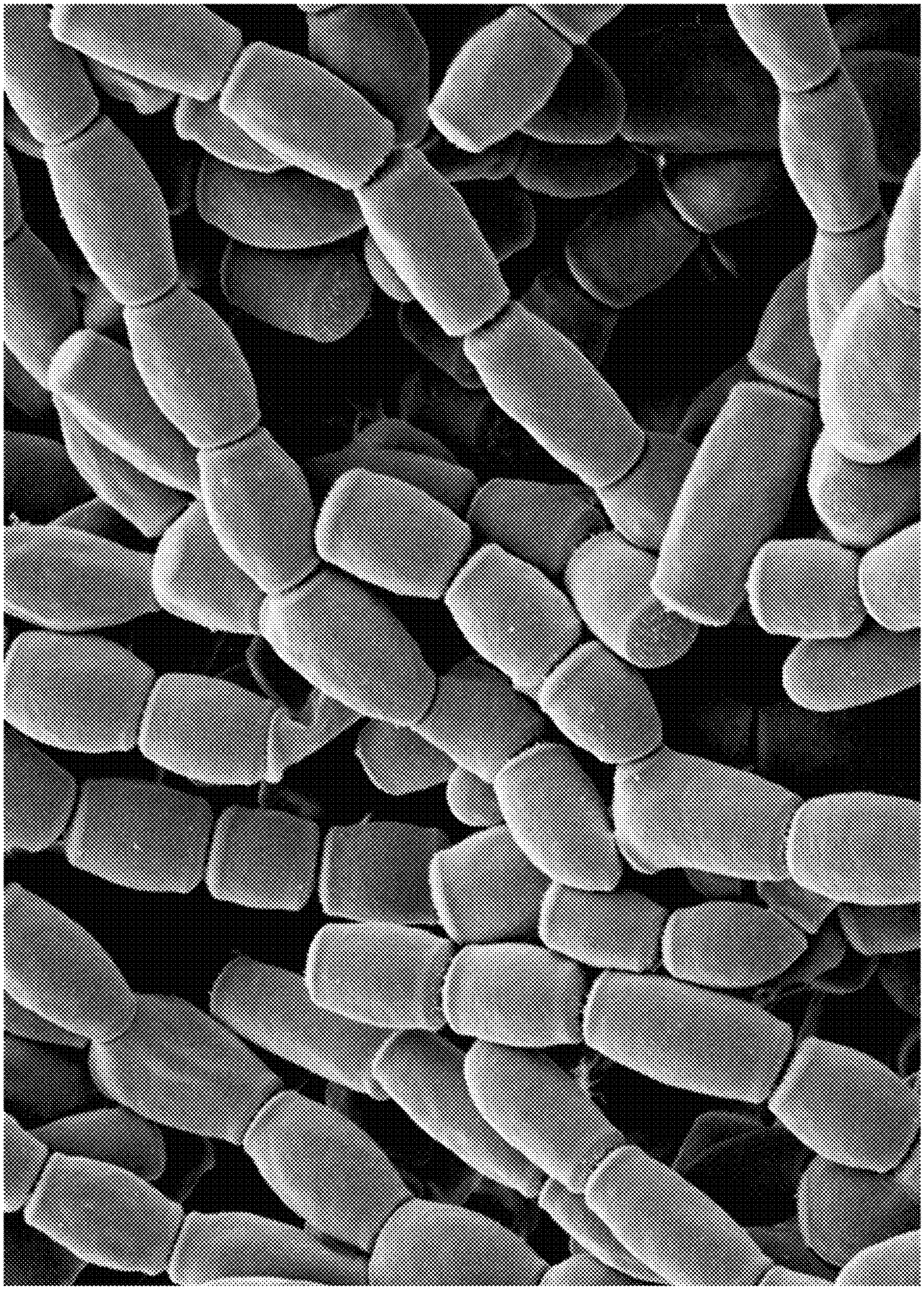
FIG. 4 is an image illustrating the arthrospores of *Tuber aestivum* (the summer truffle) showing the spores at a size of 3.5 μm in width and 5.2 μm in length as done by scanning electron microscopy.

Some of the characteristics of the white truffle (*Tuber magnatum*) are described below:

1. Relatively slow growth on PDA medium of 1.1 mm per day.
2. Production of slightly hyaline hyphae leading to whitish mycelia growth.
3. Immediate production of fused hyphae into synnemata (fruiting structures).
4. Abundant production of conidiospores (conidia) on conidiophores and multiple conidiophores (synnemata) that are dimorphous, some in the range of about 3.0 μm in length and other that are two celled and longer at about 6.7 μm (FIG. 3). Initially, the spores are produced on the termini of branched conidiophores and during the fixation processes the conidia break off from the conidiophores and leave scarred ends of these structures (FIG. 3 insert).
5. Initial colony color is white eventually with portions tuning tan to brownish.
6. Older colonies turn dark brown.
7. Definite truffle odor developing on the colonies.
8. Eventual formation of mini-truffles pecan agar plates at 1-2 weeks.
9. The ITS sequence of *T. magnatum* is provided in SEQ ID NO: 2. It is not identical to any of the other truffle species.

The pure cultures of white truffle was found to grow with any plant product and can grow with just the combination of glucose, peptone and yeast extract.

Additionally, some of the characteristics of the summer truffle (*Tuber aestivum*) are described below:

1. Relatively rapid growth on PDA medium of 2.8 mm per day.
2. Production of hyaline hyphae leading to a white mycelium that forms interwoven rope like strands.
3. Production of conidiophores and then synnemata and many arthrospores (conidia). The spores are truncated, and barrel shaped with an average length of 5.2 μm and width of 3.5 μm (FIG. 4).
4. Older colonies stay whitish.
5. An initial fruit like odor developing in the culture plates.
6. Mini-truffles production in 2-3 weeks on the pecan agar.
7. The ITS sequence of *T. aestivum* is provided in SEQ ID NO: 3. It shows 98% sequence identity to *Geotrichum* which also makes arthrospores, but it is not a *Geotrichum* by all other indications.

Figure 6:
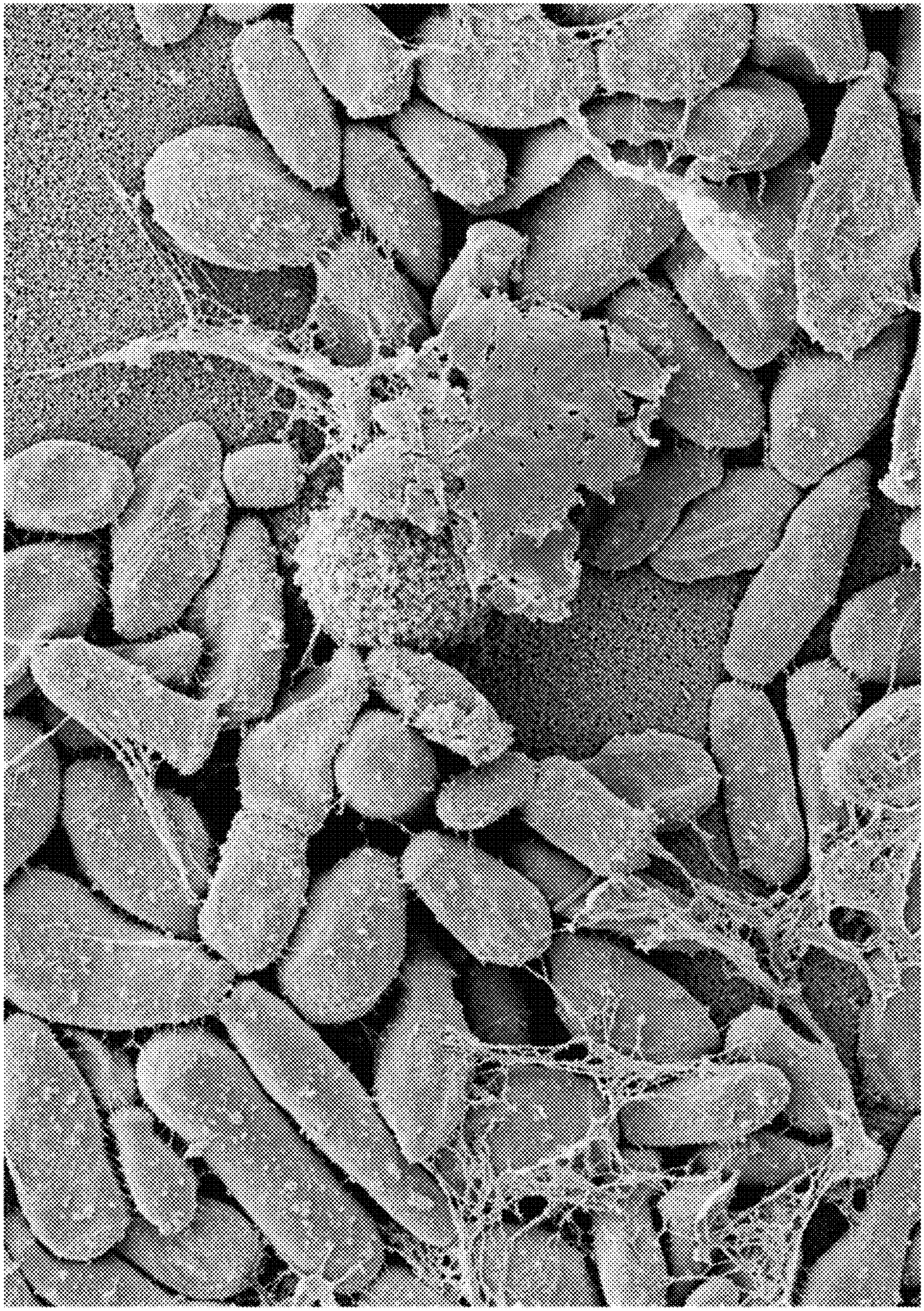
FIG. 6 is an image illustrating a scanning electron micrograph of the spores and hyphae of *Tuber uncinatum*. The spores shown vary widely in shape and size averaging 9.2 μm in length and 3.6 μm in diameter. Some of the matrix material of the mini-truffle pellicle is also shown.

Characteristics of the burgundy truffle (*Tuber uncinatum*) are shown below:

1. Relatively slow growing at 1.0 mm per day.
2. Production of hyaline hyphae eventually growing into a white mycelium that forms interwoven rope like strands.
3. Production of synnemata with abundant conidia born on conidiophores. The conidia are oddly shaped but do average 3.6×9.2 μm in size (FIG. 6).
4. After several weeks on PDA the culture medium begins to turn a burgundy color which supports the name of this interesting truffle.
5. At 4-5 weeks on pecan agar the fungus begins to make mini truffles that are whitish and small and having an erumpent surface just as the mature naturally harvested older truffles—i.e., 0.3 mm. Scanning electron micrographs show the formation of a nice pellicle layer over the mini truffle surface.
6. The cultures of this fungus commonly form a greasy appearance because of the huge number of conidia that are formed. The mycelium remains whitish over many months.
7. The ITS sequence of T. *uncinatum* is provided in SEQ ID NO: 4. It is not related to any of the other truffle fungi.

Figure 5:
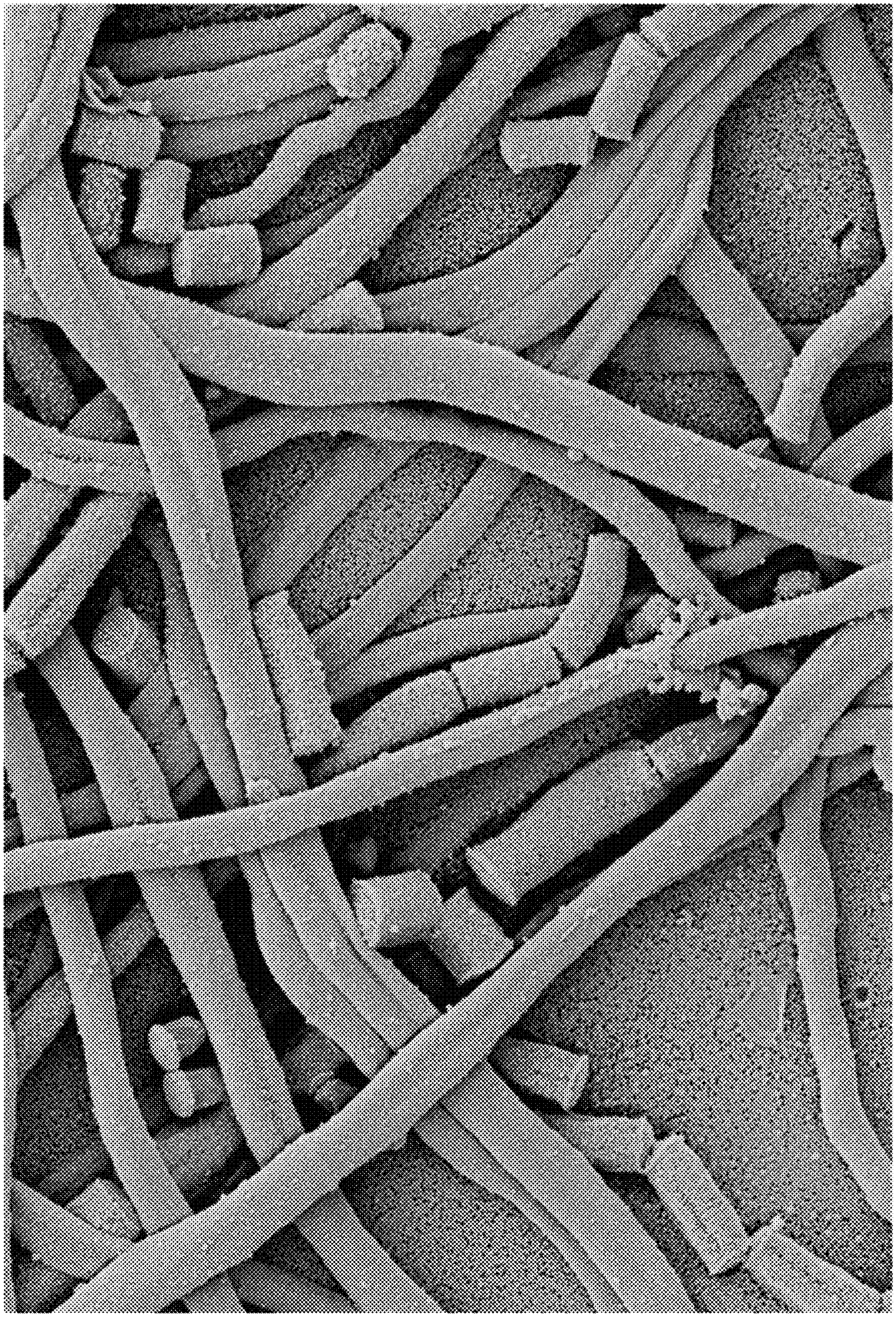
FIG. 5 is an image illustrating the hyphae and conidia of *Tuber borchii* as seen by scanning electron microscopy. The spores are averaging 4 μm in width and 5.6 μm in length with a few much longer.

Some of the characteristics of the whitish truffle fungus (*Tuber borchii*) are described below:

1. Relatively rapid growth on PDA medium of 3.0 mm per day.
2. Production of hyaline hyphae eventually growing into a white mycelium that forms interwoven rope like strands.
3. Production of conidiophores with conidia on termini of branches and then synnemata and many arthrospores (conidia). The spores are truncate and barrel shaped with an average length of 5.6μ and width of 4.0μ (FIG. 5).
4. Older colonies stay whitish
5. An initial fruit like odor developing in the culture plates.
6. Mini-truffle production in 2-3 weeks on pecan agar.
7. The ITS sequence of *T. borchii* is provided in SEQ ID NO: 5. The sequence is very closely related to the sequence of *T. aestivum* but not to the other truffle fungi as per *T. melanosporum* (above).

Characteristics of the North American truffle fungus (*Imai* sp.) are described below:

*Imaia* is a fungal genus in the family Morchellaceae found in Japan, and in the Appalachian Mountains of the US. A monotypic genus, *Imaia* was circumscribed in 2008 by James Martin Trappe and Gibor M. Kovácsto to contain the truffle-like species formerly known as *Terfezia gigantea* when molecular analysis demonstrated that its DNA sequences were markedly different from those of *Terfezia*. The fruit bodies of *Imaia gigantea* are spherical to roughly elliptical to irregular in shape, brown, and usually develop cracks in age. The interior gleba comprises brown pockets of asci separated by white veins. The spores are spherical or nearly so, up to 70 μm long, and enclosed by a thick epispore.

After isolation and examination, it showed the following characteristics:

1. Hyaline hyphae growing on PDA at a rate of 2.5 mm per day at 22° C.
2. Producing a totally whitish mycelium not developing any pigmentation over several months held on PDA.
3. It produced whitish mini—truffles 3-5 mm in diameter on pecan agar after two weeks of incubation at 22° C.
4. It produced a mixture of a wonderfully aromatic mixture of volatile organic compounds after a week having been grown on PDA.
5. It produced an abundance of synnemata on PDA and the conidiospores (arthrospores) associated with the synnemata resembled (in size and shape) those of both *T. aestivum* and *T. borchii* (FIGS. 4 and 5).
6. The fungus was fermented on Thompson seedless grapes as well as ground pecans for two weeks at 22° C. The decanted filtered grape juice was given a ranking of 8.5 whilst the unfermented juice was ranked at 6.0 (see Table 7 below). Also, the fungus product from pecans was dried and ground. It produced a powder with a nice truffle taste having a pecan tasting background (see Table 5 below).

7. This truffle fungal isolate can be saved by growing it on sterilized white rice grains for several weeks and then putting them in cryovials and placing them at −80° C. or placing the conidiospores in vials with sterile water and storing at 2-3° C. (see section on storage below). Characteristics of the Oregon white truffle are described below:

*Tuber gibbosum*, the Oregon white truffle, has been isolated from an Oregon white truffle obtained directly from a white truffle harvester in Oregon. The fungus was examined and shown to possess all of the characteristics of the *Tuber* fungi including having an ability to make profuse synnema with thousands of conidiospores along with a rounding up of the mycelium into small truffle like bodies. After incubation on common laboratory media the fungus began to make a wonderfully odoriferous food like aromas.

Newly acquired white and black truffle specimens acquired from Europe both yielded new cultures of their respective fungal truffle species, showing that the patented methods for acquiring these truffle fungi are effective regardless of the native geographical region of the truffle specimens.

Table 1 provides brief description of commercial truffle species. Table 2 lists ITS sequences for pure culture of truffle. Each of the truffle fungi described in Tables 1 and 2 were originally obtained, as freshly harvested truffles, from their natural geographic sources and then used as a biological source of the pure cultures once these organisms were successfully isolated.

TABLE 1

Brief Description of Truffle Species

| Common Name | Species | Brief Description |
|---|---|---|
| Black Truffle | *Tuber melanosporum* | The black truffle or black Périgord truffle, the second-most commercially valuable species, is named after the Périgord region in France. Black truffles associate with oaks, hazelnut, cherry, and other deciduous trees and are harvested in late autumn and winter. |
| White Truffle | *Tuber magnatum* | This high-value white truffle (tartufo bianco d'Alba in Italian) is found mainly in the Langhe and Montferrat areas of the Piedmont region in northern Italy, and most famously, in the countryside around the cities of Alba and Asti. A large percentage of Italy's white truffles also come from Molise. |
| Summer Truffle | *Tuber aestivum* | The black summer truffle is found across Europe and is prized for its culinary value. |
| Burgundy Truffle | *Tuber uncinatum* | Burgundy truffles (designated Tuber uncinatum) are harvested in autumn until December and have aromatic flesh of a darker color. These truffled associate with various trees and shrubs. |
| Whitish Truffle | *Tuber borchii* | The "whitish truffle" is a similar species native to Tuscany, Abruzzo, Romagna, Umbria, the Marche, and Molise. It is reportedly not as aromatic as those from Piedmont, although those from Città di Castello are said to come quite close. |
| An Appalachian truffle | *Imaia* spp. | This species is found in very limited areas in the Appalachian Mountains of Eastern USA. |
| "garlic truffle" | *Tuber macrosporum* | Less common truffle. |
| Oregon black truffle; Oregon spring white truffle | *Tuber gibbosum*; *Tuber oregonense* | Notable U.S. Pacific Northwest species of truffles, among several species of truffle harvested both recreationally and commercially. |
| Pecan truffle | *Tuber lyonii* syn. *Texense* | Found in the Southern United States, usually associated with pecan trees. Chefs who have experimented with them agree "they are very good and have potential as a food commodity." |

TABLE 2

ITS Sequences for Isolated Truffle Fungi

| SEQ ID NO | Truffle Species | ITS Sequence |
|---|---|---|
| SEQ ID NO: 1 | *T. melanosporum* | CCTGTGACATACCTATTGTTGCTTCGGCGGGATCGC CCCGGCGCCCTCGGGCCCGGACCCAGGCGCCCGCC GGAGGACCCAAACTCTTGTCTTCATGAGAATCTTCT GAGTAACACAAGCAAATAAATTAAAACTTTCAACA ACGGATCTCTTGGTTCTGGCATCGATGAAGAACGCA GCGAAATGCGATAAGTAATGTGAATTGCAGAATTC CGTGAATCATCGAATCTTTGAACGCACATTGCGCCC GCCAGTATTCTGGCGGGCATGCCTGTTCGAGCGTCA TTTCAACCCTCAAGCCCCCGGGCTTGGTGTTGGGGA TCGGCCGCCCTCCGGCGCGCCGGCCCCGAAATCTA GTGGCGGTCTCGCTGTAGCCTCCTCTGCGTAGTAAC ACACCTCGCACCGGAACGCAGCCTGGCCACGCCGT TAAACCCCCCACTTCTGAAGGTTGACCTCGGATCAG GTAGGAATACCCGCTGAACTTAAGCATATCAATAA GCGGAGGAA |
| SEQ ID NO: 2 | *T. magnatum* | CCCTGTGACATACCATATTGTTGCCTCGGCGGTGCC TGTTTCGGCAGCCCGCCAGAGGACCCAAACCCTAG ATTACATTAAAGCATTTTCTGAGTCAATGATTAAAT CAATCAAAACTTTCAACAACGGATCTCTTGGTTCTG GCATCGATGAAGAACGCAGCGAAATGCGATAAGTA ATGTGAATTGCAGAATTCAGTGAATCATCGAATCTT TGAACGCACATTGCGCCCGCCAGTATTCTGGCGGGC ATGCCTGTCCGAGCGTCATTTCAACCCTCAAGCCCC |

TABLE 2-continued

ITS Sequences for Isolated Truffle Fungi

| SEQ ID NO | Truffle Species | ITS Sequence |
|---|---|---|
| | | CGGGCTTGGTGTTGGAGATCGGCGAGCCCCCCGGG GCGCGCCGTCTCCCAAATATAGTGGCGGTCCCGCTG TAGCTTCCTCTGCGTAGTAGCACACCTCGCACTGGG AAACAGCGTGGCCACGCCGTAAAACCCCCCACTTC TGAAAGGTTGACCTCGGATCAGGTAGGAATACCCG CTGAACTTAAGCATATCAATAAGCGGAGGAA |
| SEQ ID NO: 3 | *T. aestivum* | GTGANTTACACNGCAACAATAATTTTATANTCAAAN ACNNAAAATAATCAAAACTTTTAACAATGGATCTCT TGGTTCTCGTATCGATGAAGAACGCAGCGAAACGC GATATTTCTTGTGAATTGCAGAAGTGAATCATCAGT TTTTGAACGCACATTGCACTTTGGGGTATCCCCCAA AGTATACTTGTTTGAGCGTTGTTTCTCTCTTGGAATT GCATTGCTTTTCTAAAATTTCGAATCAAATTCGTTTG AAAAACAACACTATTCAACCTCAGATCAAGTAGGA TTACCCGCTGAACTTAAGCATATCAANNNGCGGAGG |
| SEQ ID NO: 4 | *T. uncinatum* | ACTATATCCATCTACACCTGTGAACCGTTTGATTGA ATCTTCTGATTCAATTTTACAAACATTGTGTAATGA ACGTCATTAGATCATAACAAAAAAAAACTTTTAAC AACGGATCTCTTGGCTCTCGCATCGATGAAGAACGC AGCGAAATGCGATAAGTAATGTGAATTGCAGAATT CAGTGAATCATCGAATCTTTGAACGCAACTTGCGCT CTCTGGTATTCCGGAGAGCATGCCTGTTTGAGTGTC ATGAAATCTCAACCATTAGGGTTTCTTAATGGCTTG GATTTGGAGGTTGCCATTCTAAATGGCTCCTCTTAA AGGAGTTAGCAAGTTTTACTATTGCTATCTGGCGTA ATAAGTTTCGCTGGAATGGTATTGTGAAGCGTGCTT CTAATCGTCTTCGGACAATTACTTTGACTCTGGCCT CAAATCAGGTAGGACTACCCGCTGAACTTAAGCAT ATCAATAAGCGGAGGAA |
| SEQ ID NO: 5 | *Tuber borchii* | TTGTGATTTACCACAGCAACAAAAATCATACAATCA AAACAAAAATAATTAAAACTTTTAACAATGGATCTC TTGGTTCTCGTATCGATGAAGAACGCAGCGAAACG CGATATTTCTTGTGAATTGCAGAAGTGAATCATCAG TTTTTGAACGCACATTGCACTTTGGGGTATCCCCCA AAGTATACTTGTTTGAGCGTTGTTTCTCTCTTGGAAT TGCTTTGCTCTTCTAAAATTTCGAATCAAATTCGTTT GAAAAACAACACTATTCAACCTCAGATCAAGTAGG ATTACCCGCTGAACTTAAGCATATC |

Basically stated, each of the many truffle fungi listed above are now available in pure culture. These truffle fungi can now be grown on a plethora of natural or artificial media which will make available an untold number of possible novel products each with a different set or combination of flavors. That is, since the fungus has been provided with different substrates on which to grow thus converting substances in the growth source to other flavor-like compounds and combinations thereof. Likewise, the isolation procedure will readily allow for the recovery of numerous local strains of the fungus which may prove useful in finding stand alone and unique natural foods. In this case, novel flavors can be created by actually growing the truffle fungus on grains, nuts, powders, floral parts or literally natural food source or mixtures of such products.

Figure 9:
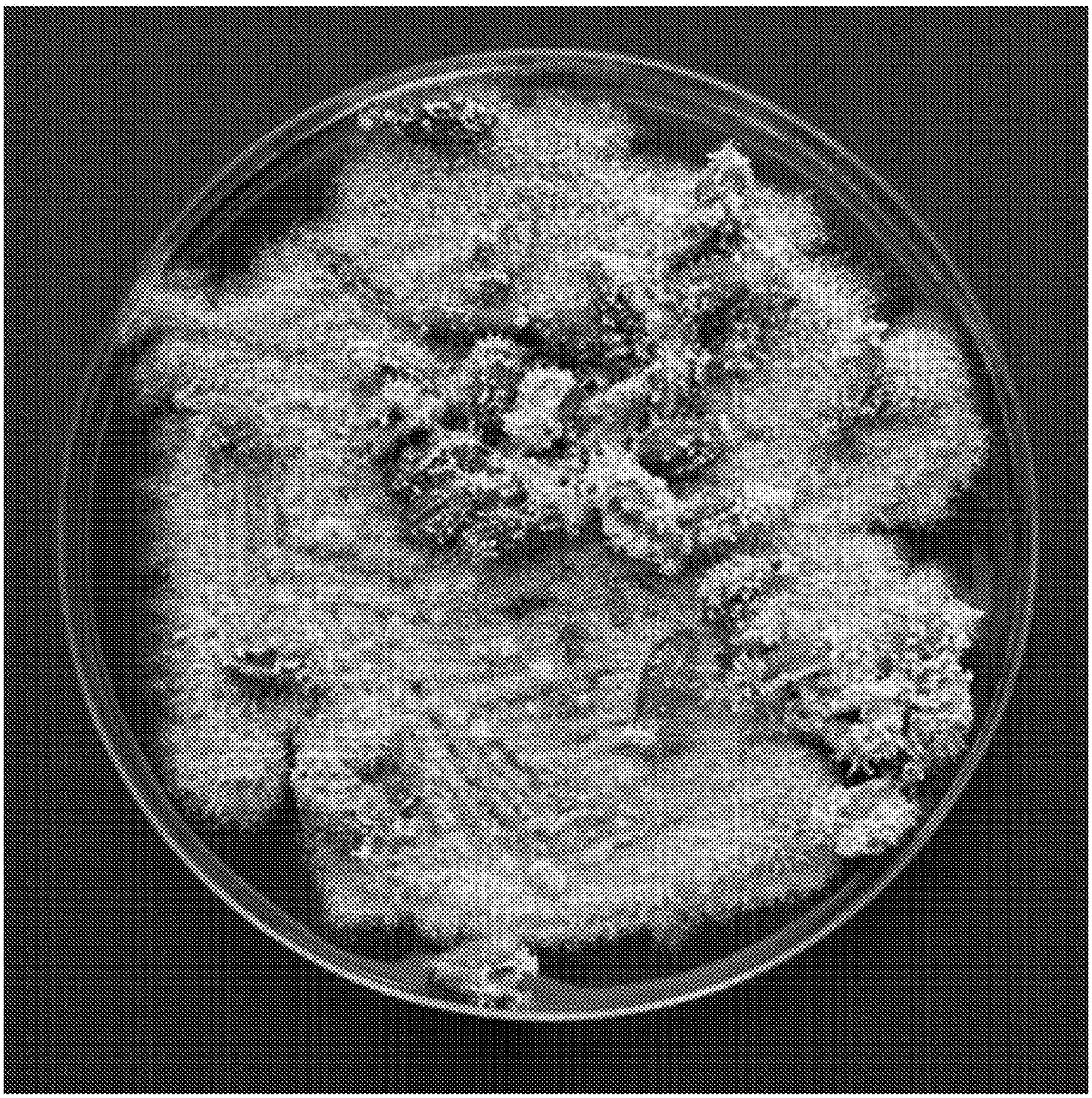
FIG. 9 is an image showing an older culture of the black truffle fungus (*T. melanosporum*). The fungus is growing on sterilized barley seeds.
Figure 11:
FIG. 11 is an image showing one year old dried barley seeds infested with *T. melanosporum* placed in damp soil for 2 days already show the production of new mycelium, synnemata and spores (arrows).

Presently, trees are inoculated with the truffle fungi by dipping the roots into a puree of the truffle fungus that is desired. This is a costly, unsatisfying, and non-scientific proposition since the truffles themselves are not containing a myriad of infectious conidiospores and are contaminated with a plethora of other fungi and bacteria all of which portend of unexpectedly poor and undesirable outcomes. However, now with pure cultures of many truffle fungi can be easily grown on sterile grains such as de-hulled barley, rye, wheat or rice wherein there is an abundant production of infectious conidiospores (FIG. 9). These grains, after two—3 weeks of fungal growth can be dried under aseptic conditions at room temperature and stored under refrigeration (freezing or 40° F.) or at room temperature (22° F.) for up to a year with no significant decline in viability (FIG. 11). Subsequently, these infested grains can be used as inoculum for plant roots by placing them near to the roots of the desired plant species that will serve as the host.

EXAMPLES

The present disclosure is further illustrated by the following examples that should not be construed as limiting. The contents of all references, patents, and published patent applications cited throughout this application, as well as the Figures, are incorporated herein by reference in their entirety for all purposes.

Example 1. Use of Isolated Truffle Fungi Species

Pure cultures of many of the truffle fungi described above have been developed available. Each of these can now be grown on artificial and natural media, as well as a wide range of natural products such as grains, nuts, and fruits which will make available an untold number of possible novel products each with a different set or combination of flavors. The truffle fungus will potentially convert the natural products in the grain or fruit into other compounds that have interesting and useful flavored substances lending novelty to the fermentation process and new product development.

Furthermore, the novel truffle fungus isolation procedure disclosed above will readily allow for the recovery of numerous local strains of the fungus which may prove useful in finding stand alone and unique natural foods. In this case novel flavors can be created by growing the local truffle strains of the fungus on grains, nuts, powders, floral parts or mixtures of such natural plant products.

The technique for culturing these fungi on seeds and grains is mostly done by solid state fermentation as follows:

1. Use 1 liter volume of the product such as rye, rice or barley seeds water
2. Add water at 0.5 up to 3.0 liter (depending upon the seeds being used)
3. Then add 5 g glucose, 1 g peptone, and 2 g of yeast extract stir liberally.

Various sized Erlenmeyer or other specially designed glass flasks may be used to carry out the fermentation process. The truffle fungi prefer not to grow in a submerged state, therefore the amount of water present in the final mixture is critical to fungal growth and development. However, in most cases for solid-state mass production, the mixture is placed in a plastic bag having a 1.5- to 2-inch-wide portal that is plugged with a foam cylinder and covered with a sheet of aluminum foil after inoculation. Autoclaving is done for 30-40 min or longer, in order to achieve complete sterilization of the contents. Upon cooling the bag is then inoculated with the spores and mycelium of one of the truffle fungi by placing them though the opening port in the bag. One way to inoculate the bag with spores is, for example, by inoculating with 10-20 *Tuber* spp. infested barely seeds that had been incubated on a PDA plate for several weeks. The spores and mycelium then grow throughout the contents of the plastic bag. The bag is incubated under still conditions in the dark at 19-22° C. for 3-8 weeks with periodic mixing of the contents by handling. A temperature lower than that of normal room temperature is preferred i.e., 19-20° C.

Figure 10:
FIG. 10 is an image illustrating the rye truffle powder made from the fermentation of the black truffle on sterile rye seeds. Powders like this are the main products of the truffle fungi fermentation processes.

The contents of the bag may be treated differently, depending upon what is being fermented. Initially, various grains/seeds including wheat, rice, rye, lentils and barley were fermented utilizing the first truffle fungus that was successfully isolated—*Tuber melanosporum*. After fermentation the seeds were removed and placed on a flat metal pan and heated at 60° C. in order to effectively dry the product. The seeds are then ground to a fine powder and thus made ready as a product for testing. The dark powder rye truffle product (FIG. 10) is now widely sold as an additive to salt (truffle salt) and olive oil (truffle oil) and finished bagged products such as truffle potato chips (Table 4). The development of other powders resulting from the fermentation of this truffle fungus on various other seeds has been done and the products have been tested and are being made ready for the marketing process (Table 4). This includes the novel black truffle products made with lentils, brown rice, wheat and barley as substrates for the fungus. Finally, soybeans were used as a substrate for the black truffle fungus and both the liquid (filtrate from the fermentation process) and the dried powder produced a basic classic truffle flavored product. The liquid has the potential of being labeled as truffle soy sauce after the famous Japanese soy sauce but with the added truffle flavoring notes (Table 4). The various powders made from these grain fermentations may be used for flavorings for hot drinks, salts, oils, vinegars, as well as for seasonings for meats, baked goods, eggs, and soups. Appropriate testing has been done to demonstrate the practical uses of each of these plant sourced fermentation powders.

TABLE 4

| Plant source or nutrient source | Final product | Uses of product | Public acceptance And sales |
|---|---|---|---|
| Rye | Dark brown powder | Truffle salt, truffle olive oil, potato chips, general flavoring | Yes-worldwide marketing and sales for uses indicated |
| Barley | Light brown powder | Potential for breads, biscuit mixes, general flavoring-maybe pizzas coffee and tea flavoring | In development |
| Wheat organic (Kamut) | Light brown powder | A flavoring substance with a mild truffle taste For eggs, meats, drinks | In development |
| Lentil | Brown powder | Used to flavor soups, drinks, salts and oils | A novel product with multiple uses. |
| Brown rice | Brown powder | Food flavoring as per the rye product above and coffee flavoring additive. Maybe a better substrate for the fungus than the rye | Tested for many uses and accepted as a potential product as per the rye product above |
| Soybeans | Liquid from fermentation/brown powder from dried fermentation product | Mild but distinctive truffle smell and taste Truffle flavoring agents | In development and may have potential as products but will require research |

Fermentation of the black truffle (*T. melanosporum*) on various substrates and the products and uses derived thereof. It is to be noted that each of these products has its own distinct odor and flavor. A multitude of uses are currently and potentially possible.

Besides grains there are a plethora of other seeds, and nuts that may serve as potential fermentation sources for the truffle fungi. To this end, a representative list of commonly available natural products was tested for their abilities to support the growth of the various truffle fungi and make novel useable and desirable food products. In the case of nuts and seeds the fermentation was carried out as described above in the grain testing experiments. The initial tests were done with pecans incubated with the black truffle fungus; the final product was a viscous liquid mash like product which could be utilized in a multitude of ways. The white truffle fungus was also fermented in this manner. The final fermentation product could also be dried and ground to a powder for use (Table 5). However, the viscous liquid product, taken directly from fermentation, could ideally be used as a dressing for buns, biscuits, toast, waffles or crackers and a plethora of other foods especially when mixed with honey or maple syrup for a sweetened version of the truffle/pecan mixture.

As an example of the utility of the black truffle-pecan mash is the production of a mixture that is tasty and has a multitude of uses. The product is made by making a 50:50 v/v mixture with honey which can be used as a novel biscuit, toast or waffle spread. Modifications of the mixture can be made by varying the ratio of honey to the pecan/truffle fermentation product down to the 5% level still with acceptable taste results. A taste test of the 50/50 mixture was given to a panel of local adults and their responses showed overwhelmingly that they thought the product was tasty and novel (Table 6). Two respondents did not like the truffle smell and taste, and this is a perfect match to the general population i.e. approximately 20% who feel likewise with truffle products. A similar mixture was made with English walnuts yielding and entirely different tasting dried product with both the black and white truffle fermentation products. Different ratios of the honey to the nut/truffle product have also been made and tested with comparable results. Other possibilities include hazelnuts, peanuts, almonds, brazil nuts, cashews, pistachios, macademia, chestnut, and cacao. These results provided encouragement to proceed with other nuts and seeds as per Table 5.

As outlined above many other nuts and seeds were fermented using the exact fermentation formula and conditions as described for pecans and walnuts as shown in Table 5. As an example, coffee beans were fermented for 6 weeks on sterile coffee beans and the sugar/peptone mixture, and the final dried product (as above) was ground and mixed at different levels with standard coffee bean powder and made into a delicious drink. The final product was made by mixing either 10% or 20% of the truffle coffee bean powder with 80 to 90% of regular coffee beans to make the brew for the best truffle/coffee taste. Also, the addition of cream to the coffee bean mixture resulted in a wonderful tasting truffle/coffee/latte (Table 5).

The same process has been applied in making a truffle cocoa mix using one or more of the truffle powders or mash products to be mixed/added to standard cocoa powder or powder mixture to produce the drink (Table 5). In each of the nut/bean cases novel products can be made as candies mixed with chocolate, white chocolate or other sugary substances to yield novel tasting products each of which can be labeled with the truffle species used to make the product. Such is the case with the hazelnut whose taste was distinctly unique from the other nut products (Table 5).

In each of these examples done with the black truffle, the process can be substituted with any of the other truffle fungi that have been isolated by the methods described and subsequently applied to the fermentation schedules as outlined for the black truffle (Table 4). Basically, totally new products can be made because the flavoring is different with each of the truffles. Virtually all the major truffle species have been isolated in this manner and testing has shown that they do grow on natural products such as seeds and beans as per the *T. melanosporum* (black truffle). Furthermore, it is extremely likely that individual truffle isolates will have important subtle flavoring properties that are unique to them which makes the isolation and acquisition of individual truffle strains even more important.

TABLE 5

| Plant source | *T. melanosporum* | *T. borchii* | *T. uncinatum* | *T. magnatum* | *T. aestivum* |
|---|---|---|---|---|---|
| White rice long grain | Dark brown powder for salt and oil flavorings | A nice mild flavored product as a seasoning | A potential mild flavoring product | A nice sweetened product with A special nutty taste-potential flavoring | No product |
| Brown rice Long grain | Dark brown powder for truffle flavorings | | A novel flavored sweet product for a multitude of flavorings | A very nice intense fruity/truffle flavor# | — |
| Pecan mash or Pecan powder | Mixed with honey or maple syrup-novel food products* | | | Mix with honey or maple syrup-nutty/mild truffle taste at 10%* | |
| Walnut English-mash or powder | Mixed with honey for a unique nut product for toppings, spreads | | | Mix with honey or maple syrup - nutty/mild truffle taste at 10% | |
| Hazelnut mash+ | Mixed with honey or maple syrup for toppings | | | | |
| Pine nut | Dried product with novel tangy-peppery taste | | | | |
| Mustard | A taste better than mustard with nice truffle flavored product-tangy | | | Very unique mild truffle taste-no bitterness-a novel mustard product- | |
| Cacao roasted | Dried powder tastes like chocolate but no bitterness | | | | |
| Coffee beans+ | Mixed up to 10% with regular coffee, yields truffle/coffee | | | | |
| Sunflower+ | For flavorings has the standard truffle odor and taste | | | For tapenades, -umami taste Great Seasoning | |

TABLE 5-continued

| Plant source | *T. melanosporum* | *T. borchii* | *T. uncinatum* | *T. magnatum* | *T. aestivum* |
|---|---|---|---|---|---|
| Sesame | A remarkably novel spicy tasting powder for seasonings | | | | |
| Soybean Powder and/ or liquid fermentation products | See table 3 | | | Fermentation liquid, as well as powder- umami flavor | |

*See Table for subject evaluation ratings for this product as an example of how evaluations of these novel products were performed (Table 6). This fungus made useable large truffle like structures in this culture.

+These are very promising and very surprising novel products.

A totally unexpected result was obtained when the fermentation product of the white truffle fungus had been grown on sunflower seeds (Table 5). The dried fermentation product yielded a unique savory-umami tasting/smelling product that represents a total all around seasoning for roasts, and steaks and seafoods. It was evaluated by a well-trained chef and its use for tapenades was also suggested (Table 5). Interestingly, the pine nut product yielded a very spicey almost peppery tasting product that could be used in salad dressings and other flavoring products (Table 5). Likewise, the fermentation filtrate (white truffle) as well as the powder from the soybean test yielded nice umami-like products (Table 5).

Both the white and brown long grain rice products with the black truffle fungus yielded a black powder product for use as a general flavoring agent. The rice as a substrate has the advantages of being relatively uncontaminated and easier and quicker for the truffle fungi to ferment based on the ease and shorter times for the fungi to grow and develop on these substrates. Both the burgundy and the whitish truffle fungi did yield potential mild flavoring products on white long grained white rice, but no products could be obtained from the summer truffle (Table 5). Finally, mustard sauce made from the white and black truffle fermentation products yielded totally novel tasting mustards with white and black truffle tasting overtones with totally unique very distinctive appetizing flavors (Table 5).

TABLE 6

Taste panel evaluation of the black truffle pecan honey syrup product mixed 10-20% by weight with honey.*

| Person's designation | Novelty of product 1-10 low to high | Would you buy it if available reasonably | Added comments |
|---|---|---|---|
| 1 | 7 | Yes | Chocolate taste |
| 2 | 7 | Yes | Different nice taste |
| 3 | 8 | Yes | Hint of chocolate |
| 4 | 7.5 | Yes | Chocolate taste |
| 5 | 6.5 | Yes | Toffee-like |
| 6 | 8 | Yes | Chocolate-like |
| 7 | 8 | Yes | Novel taste-nice |
| 8 | 8 | Yes | Very good taste |
| 9 | 8 | Yes | Excellent taste |
| 10 | 7 | Yes | Novel taste-great! |
| 11 | 0 | No | Bad smell |
| 12 | 10 | Yes | Great, wonderful |
| 13 | 10 | Yes | Perfect treat taste |
| 14 | 8 | Yes | Novel, interesting |
| 15 | 8 | Yes | Very nice taste |

TABLE 6-continued

Taste panel evaluation of the black truffle pecan honey syrup product mixed 10-20% by weight with honey.*

| Person's designation | Novelty of product 1-10 low to high | Would you buy it if available reasonably | Added comments |
|---|---|---|---|
| 16 | 0 | No | Intolerable taste |
| 17 | 7 | Yes | Nice taste- surprise |

All subjects were adults living in Bozeman and many were professionals or student volunteers. They had many suggestion for the use of the product i.e. for toast, waffles, and a spread for fancy crackers. The two outliers reflected the normal human average of about 20% of the population who do not like the odor or taste of truffles or truffle products.

Besides growing the truffle fungi on seeds (grains) and nuts, a wide variety of berries and fruits were fermented into juices/drinks with novel tasting results (Table 7). In each case the following set up was done to carry out the fermentation and evaluation processes:

1. Use 150 g of fruit or berry product that was liberally smashed.
2. Added 0.25 g of peptone
3. Added 100 ml of water Incubated for 2 weeks at 19-22° C. and then the contents were filtered through 4 layers of coffee filter paper to yield mostly a clear product. Taste testing was done using at least a minimum of three subjects doing an evaluation ranking of 1-10 based on flavor, sweetness, uniqueness, desirability, and overall potential as a novel drink perhaps for use as an aperitif or digestif. The data were subjected to averaging and standard deviation of the mean (Table 7). It is to be noted that with the Thompson seedless grapes each of the truffle fungi yielded a better tasting product than the liquid product having not supported fungal growth (control) (Table 7). The same was true with all products having a grape additive including red seedless or black seedless alone, and/or blackberry alone or with any of the grape additives (Table 7). The dried cherry drink with either the black or the white truffle fungi was also superior. However, generally the golden kiwi did not yield any product with outstanding potential (Table 7). Interestingly, the yellow mango drinks with market potential were the black, whitish and summer truffle fungi (Table 7). Likewise, the red raspberries and huckleberries also yielded excellent drink products especially with the black truffle fungus, but the burgundy truffle gave excellent results with the Thompson seedless grapes, the dried cherries as well as the huckleberries (Table 7).

TABLE 7

| Plant Source | *T. melanosporum* | *T. borchii* | *T. aestivum* | *T. uncinatum* | *T. magnatum* | none |
|---|---|---|---|---|---|---|
| Thompson Seedless grapes | 9.5 ± 0.4 | 4.5 ± 0.4 | 4.0 ± 0 | 7.8 ± 1.2 | 7.3 ± .7 | 1.5 ± 0 |
| Red Seedless grapes | 9.2 ± 0.4 | — | — | — | 5.4 ± 1.0 | 1.5 ± 0 |
| Blackberry with Red Seedless Grapes | 8.0 ± 0.7 | — | — | — | — | 3.5 ± 0.5 |
| Blackberry | 6.5 ± 0.5 | 1.0 ± 0 | — | — | 2.0 ± 0 | 2.3 ± 0.5 |
| Blueberry | 7.0 ± 0 | 1.0 ± 0 | 2 ± 0.8 | 3 ± 1.4 | 3.3 ± 1.7 | 2.5 ± 0.5 |
| Blueberry with Black seedless grape 1:1 | 7.5 ± 0.4 | — | — | — | — | 3.5 ± 0.5 |
| Black seedless grapes | 7.0 ± 0 | — | — | — | — | 2.0 ± 0 |
| Dried cherries Montmorency | 9.7 ± 0.5 | — | — | 9.0 ± 0 | 7.0 ± 0 | 7.0 ± 0 |
| Golden Kiwi | 2.2 ± 1 | 1.0 ± 0 | 1.0 ± 0 | 1.3 ± 0.3 | — | 1.5 ± 0.5 |
| Yellow mango | 6.7 ± 0.5 | 6.3 ± 0.9 | 5 ± 2.2 | 0.7 ± 0.5 | 1.3 ± 0.9 | 4.3 ± 1.2 |
| Red raspberries | 9.5 ± 0.5 | | | | | 6.4 ± 0.8 |
| Freshly harvested huckleberries | 7.5 ± 0 | — | — | 7.0 ± 0.5 Different taste | 6.3 ± 0.3 Different taste | 5 ± 0.8 |

*Dried Montmorency dried cherries - fermentation done without the yeast extract since it caused some off flavoring in the first test.

Juice evaluation of the truffle fungal fermentation of various berries/fruits after incubation for 2 weeks at 22° C. and then harvested by filtering 4 layers of a coffee filter. Evaluation was done by at least 5 people who rated the juice by flavor, sweetness, uniqueness, desirability and overall potential as a novel drink. The scale was 1 lowest and 10 highest.

Truffle Fungus Used in Fermentation

*Tuber* Spp. Growth on a Special Medium to Produce Mycelium Alone

Now, if one wants a relatively pure fermentation product to be mycelium alone and not mixed with any major seed or nut or natural plant product such as seed coats or other unfermented natural seed products the following procedures are used. A fermentation process is done using only a liquid medium in still culture in order to produce an intact mycelium.

1. 0.5 g glucose
2. 0.2 g peptone
3. 0.4 g yeast extract
4. 10 g finely ground white rice powder
5. 100 ml water (this amount may vary depending upon water loss at the time of autoclaving). Only a thin layer of water is wanted on the flask bottom as the fungus does not grow well in submerged culture conditions.

Place the mixture in a 2-liter flask and add the truffle fungus. Incubate at 19-20° C. with no stirring or mixing of the flask contents during the incubation process. In all cases a very nice solid mycelium develops that can be dried, and ground into a powder or sold as an intact truffle mycelium itself. For example, mycelium may be harvested by filtration and dried at 60° C. The dried-dark mycelium can then be ground into a powder and used accordingly Also, the intact mycelium maybe be rolled as per a tortilla, and/or dried to yield a final product.

This process may take 4-8 weeks of fermentation on any number of modifications of the broth medium formula including the supplementation with methionine to yield a different set of sulfur containing flavoring products especially with the black and the white truffle fungi. The mycelium is then harvested by simply letting it slide out of the flask and then processed by drying or rolling it into tube-like shape.

Truffle Inoculum for Trees Planted in the Field for Wild-Truffle Production

To test the use of infested grains to inoculate trees in the field, 1 year old dried infested barely seeds (with *T. melanosporum*) were placed in 50 grams of loamy soil contained in a Petri plate at 22° C. The soil was then dampened with sterile water and the seeds observed as a function of time. After 3 days of incubation there was an abundance of synnemata and infectious conidiospores produced on each of the infested seeds as per visual and microscopic observations (FIG. 11). Artificially infecting the tree roots should be done over a process of several days in which dampened roots are placed with an abundance of infested barley seed prior to planting under field conditions.

Experimentally, it was determined what might be the best truffle fungal inoculum by growing *T. melanosporum* on long grained white rice with the added 5 grams glucose/1 gram peptone/2 grams yeast extract for 6-8 weeks in an aqueous suspension of 1 volume of rice per 4 vol of water with frequent stirring and mixing (same formula as above-page 26). This fungal suspension (3 vol-300 ml) was added with mixing with 5 vol (500 ml) of previously autoclaved MiracleGro® brand soil planting mixture or other organic soil mixtures. The fungal soil mixture was then placed in plastic bags and stored under diverse conditions. Basically, this would allow for the determination of which conditions would be best for storage, and shipment of a viable inoculum product.

1. A portion of the fungal soil mixture was air dried in a chemical hood at 22° C. for two days and then stored at 22° C. in a plastic bag.
2. A portion of the mixture was stored at room temperature at 22° C. in a plastic bag.
3. A portion of the mixture was stored at 3° C. in a refrigerator in a plastic bag.
4. A portion was stored a −20° C. in a plastic bag which is the freezer compartment temperature of a standard refrigerator.
5. Then a portion was stored at −80° C. in a special laboratory freezer.

Figure 7:
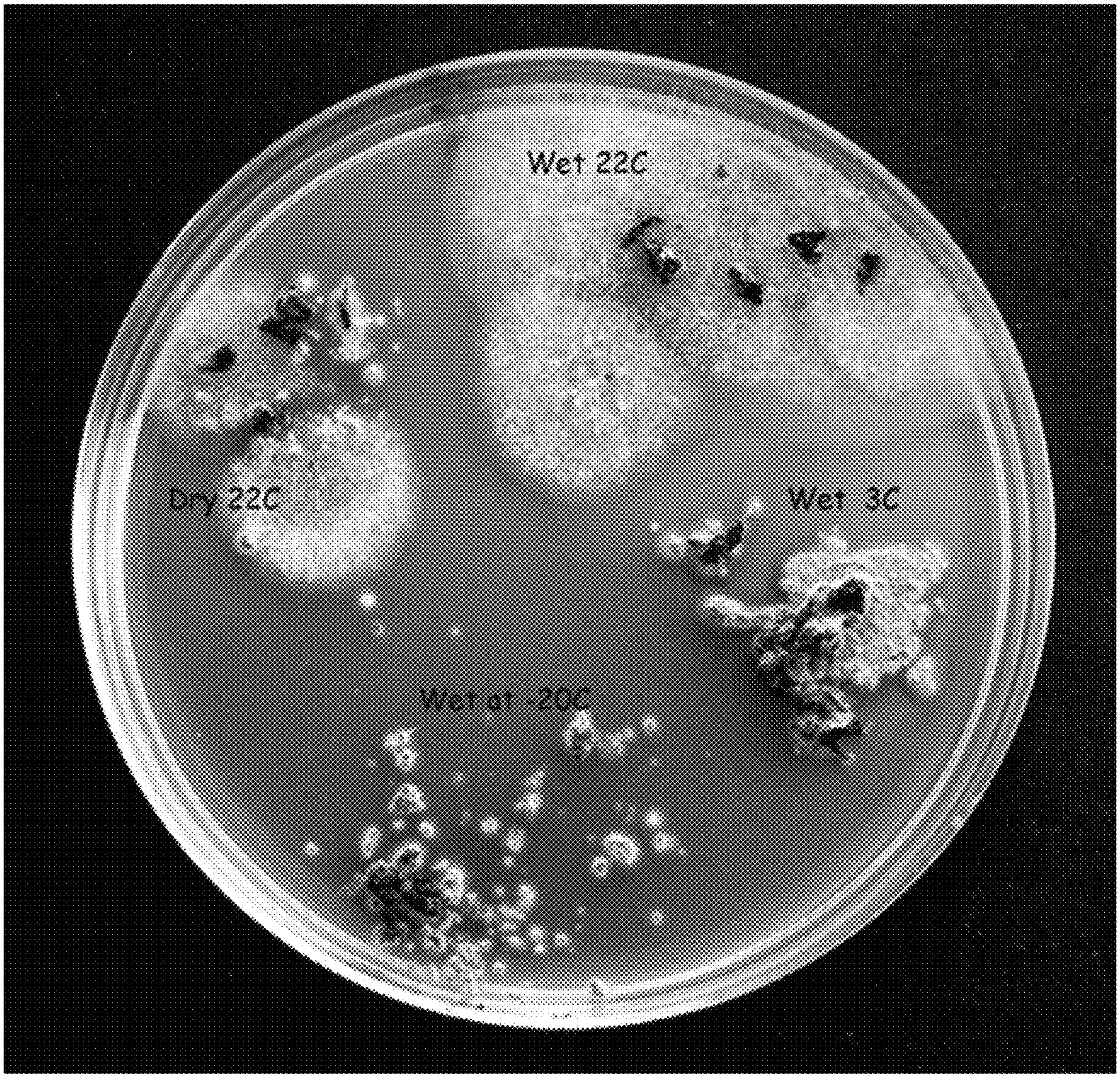
FIG. 7 is an image representation of an experimental determination of the best storage conditions of the rice fermentation/soil mixture as an inoculum for trees with *T. melanosporum*. Both the wetted mixture held at 3° C. as well as −20° C. contained no obvious bacterial or fungal colonies contamination whereas, the both the wet and dry preparations held at 22° C. displayed significant contamination.

After 1 week in each of these conditions a few mg of the contents of each bag were aseptically taken and placed upon a distinct location on a PDA plate to determine the viability of the truffle fungus and the degree of microbial contamination. It can be seen (FIG. 7), after a three-day incubation, that both the dried preparation as well as the wet sample held at room temperature exhibited contamination of the black truffle fungus by other fungi which is not acceptable. However, the preparations held at both freezing temperature −20° C. and at regular refrigerator temperature of 3° C. there was virtually no contamination and the truffle fungus flourished and remained viable. This was also true of the preparation held at −80° C. Thus, it appears that any of these methods for truffle fungal inoculum preparation would be useful as a product developed for marketing to those interested in the field production of truffles, but the −80° C. method would prove too costly to implement and provide for shipping. The dried product would also be useful as a product, but the drying process would need to be done under aseptic conditions since the fungus is present but has contaminating fungi (FIG. 7).

Figure 8:
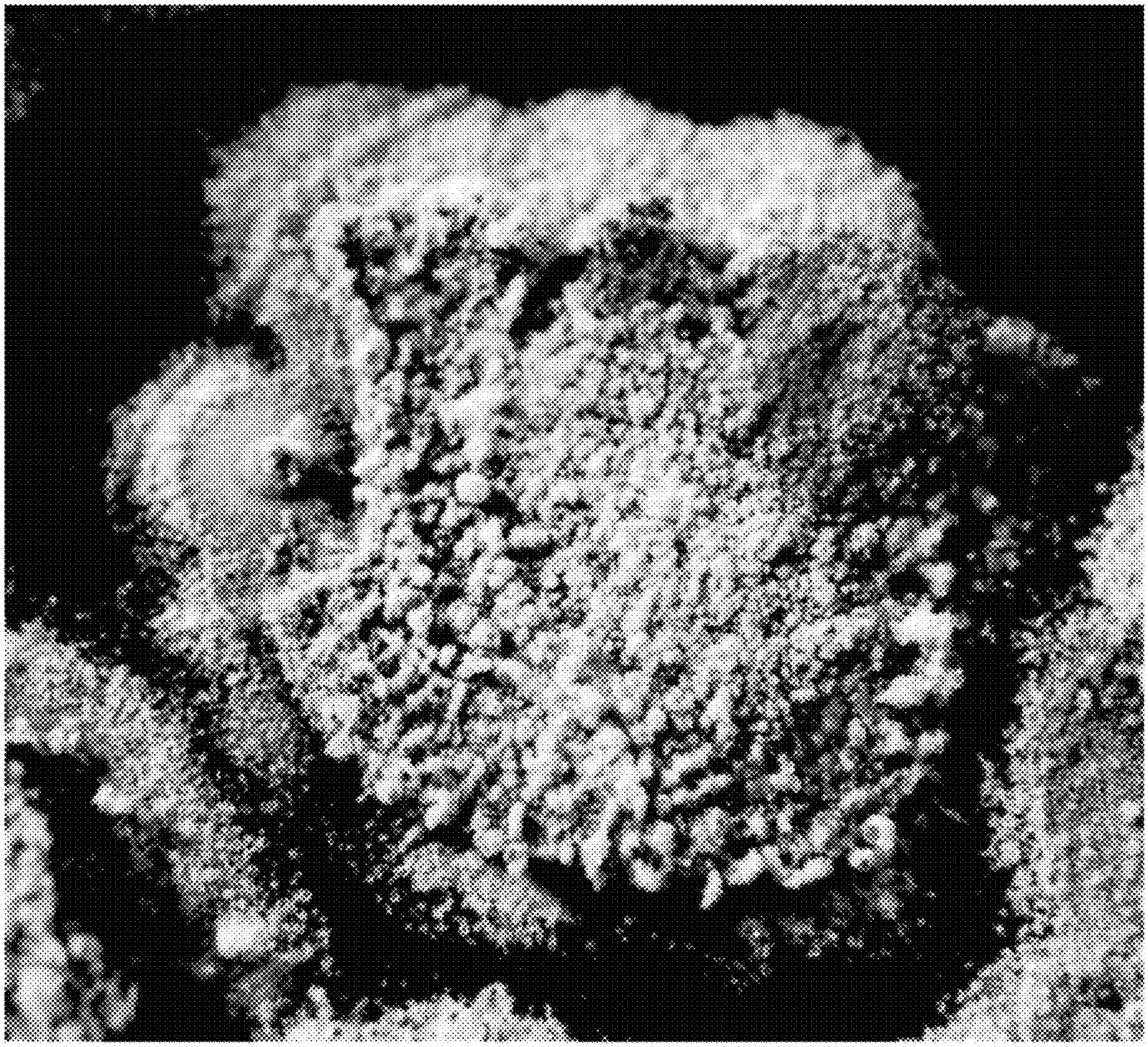
FIG. 8 is an image representation showing an oak root section two weeks after it was inoculated with the *T. melanosporum* inoculum mixture, mini-truffles began to form, as seen from the whitish tuffs of mycelium that are forming on the oak root section.

Finally, as a check to learn if the *T. melanosporum*/soil mixture (at −20° C. and −3° C. would be effective in producing truffle-like bodies in nature, experiments were carried out with the mixture placed on oak roots. White oak roots of 1- to 2-year-old trees were obtained freshly harvested from a forest in Virginia. The roots were sawed into cross sections about 2-3 mm thick. They were then sterilized by autoclaving for 20 min. as well as only surface sterilized by treating with 70% ethanol and then flaming for several seconds until the alcohol was burnt off the tissues. This latter process was repeated 3 times. The root sections were then placed on water agar and carefully inoculated with rubbing of 1-2 mg of the fungus/soil mixture on the surface of the root sections having been stored at either −3° C. or −20° C. After two weeks on both the autoclaved as well as the surface treated oak root sections small mini-truffles (0.5-1.0 mm) appeared on the surfaces of all root sections (FIG. 8). These observations strongly suggest that the fungus/soil mixture (under either of these temperature regimes) would serve as a viable and possibly a better alternative for the field inoculation of host trees for wild truffle production. But in addition, the mixture was added to water and place down several 3-4 cm holes made with an iron bar in the root region of a white oak tree growing in the Bozeman, Mt., area. In this case the results may not be known for several years, but the application methodology works perfectly.

Example 2. Procedure for Using Grains or Seeds to Make Truffle Powders

In most cases, the plant source (grains and seeds at a volume of 1-2 liters) are fermented with the truffle fungus which is placed in a "mushroom grow bag" along with between 0.5 and 3 liters of water depending upon the product being fermented. The grains (seeds) represented in this work include such things as wheat, barley (hulled or pearled or special barley selections i.e. Ethiopian), rye, rice, millet, mustard seed, and water cress seed as well as other grains and a variety of legumes including soybeans, peas, and lentils. This technique is also used when fermenting coffee berries. All coffee species particularly the thousands of varieties of *C. arabica* can be subjected to this procedure.

Then, the "grow mixture" containing 5 g glucose, 1 g peptone and 2 g of yeast extract is added and the contents of the bag is stirred liberally. Autoclaving is done to produce sterility of the contents. Under aseptic conditions the bag is carefully and aseptically inoculated with the appropriate truffle fungal species with mostly the white and black truffle species being chosen for this application. Incubation is done at the optimum temperature (20-21° C.) for between 3 and 8 weeks depending upon the truffle fungus being used. This grow mix allows for the rapid development of the truffle fungus since otherwise some breakdown time of the seed being fermented would be required to get rapid growth.

After incubation, the bags are cleaved and the contents placed on trays and heated at 160° F. in an oven to affect killing of the truffle fungus to a stage of complete drying which may take 2-3 days depending upon the water content desired for the final product.

In some cases, depending upon the seed or grain being used, the pH of the product being fermented begins to produce ammonia. This is especially true with rye fermentation. When this occurs, fungal growth ceases, and the air in the incubation space fills with toxic ammonia gas. To preclude ammonia production, 2 grams of potassium hydrogen phosphate are added to the grow mixture having a molar ratio of 9:1 of $KH_2PO_4$ to $K_2HPO_4$ or the equivalent of the sodium salts of these phosphates. Also, other buffers may be used including citric acid with the final pH adjusted to pH 6.0.

After drying the fermented product is subjected to grinding which yields a powdery product. Some form of sterilization of the powder maybe necessary. Sterilization can be achieved by either autoclaving or treatment with x-ray irradiation to reduce the amount of any unwanted bacterial contamination which can arise during the drying process. To date, no pathogenic bacterial species been found in powders produced according to the described method. The truffle powders can be stored in a cool dry place.

The powder can be used to enhance the flavor of a number of commonly used items in the diet. Truffle infused olive oil comprises 0.5-1% (by weight) powder (for example, the rye/truffle powder) in the olive oil. Truffle-infused salt comprises 1-10% by weight of the powder. Hot sauces, soy sauce and other such substances are usually made with 0.5-1.5% by weight of the powder to the sauce. In the case of coffee, the coffee/truffle powder itself is too potent to be used to make a coffee brew, and it should be diluted with regular coffee powder to a ratio of 8 to 1 or 9 to 1 (regular coffee to truffle coffee powder) to yield a palatable truffle-infused coffee brew. The truffle-infused coffee brew can be further enhanced with addition sugar, cream and other flavoring substances to yield a desired drink, as with regular brewed coffee. In the case of truffle-infused mustard, the dried truffle/mustard powder is mixed with salt, vinegar, and other choice standard ingredients to make the truffle-infused mustard sauce.

It is to be noted that in case of the soybean fermentation, however, the liquid is drained off of the fermentation bag and used as the truffle-infused product, to which is added salt and or other flavoring substances. The solution is then filtered to remove fine particles, such as of soybeans. The product has a distinctive flavor and can be used like how soy sauce would be used.

Example 3. Procedure for Using Grains, Seeds, or Roots to Make Truffle Mash or Paste All techniques for the preparation of these products are identical to those described in Example 2 including the volume of plant product, the volume of water used and the growth formula. The incubation conditions with the truffle fungus in grow bags is also identical to those described above. After incubation the fermentation product is heated to 70-71° C. for at least 20-30 min to destroy the fungus.

Longer heating period may be desirable to affect some degree of drying to yield a desired final partially dried (not completely dried product). This product occurring as a paste, mash or suspension is then prepared as the base for a final truffle product for sale, or to be used to make other desired entities.

As an example of a nut product pecan mash is prepared as above (incubated with either the black or the white truffle) yielding a thick paste. It is mixed 2 or 3 vol paste with 8 or 7 vol of honey, respectively, to yield a truffle pecan/honey product for use as a spread or topping for a variety of pastries, deserts, candies, waffles, or pancakes. Instead of honey, maple syrup can be used as the carrier for the nut/truffle fungus product. It is to be noted that the same methods can be used to make mashes of other nuts including hazelnuts, walnuts and pine nuts, etc. and this has been done and taste tested with favorable outcomes. The nut mash may also be mixed with other ingredients to yield a nut/truffle flavored product. Virtually all of the world's nuts hold potential for new product development utilizing the truffle fungi as described above.

Example 4. Procedure for Using Fruit to Make Truffle-Infused Beverages, Drinks, Digestifs, Aperitifs and Flavoring Substances In the case of acquiring fermentation liquids from the truffle fungi virtually all of the isolated truffle species have the potential as the fermentation microbe to be used. The standard additive, however, is modified to include only 0.25 g of peptone, 100 ml of water and 150 g of the mashed berry or fruit that is to be fermented. Sugar and yeast extract are not added, as the smashed fruit provides the nutrient base for the truffle fungus to thrive. The yeast extract will also negatively affect the taste of the final product, so the yeast extract should not be added. The mixture is incubated for 2 weeks at 19-20° C. (using glass flasks or a grow bag) and then the contents were filtered (for example, through 4 layers of coffee filter paper) to yield mostly a clear product. To make larger quantities of the product, the aforementioned ratios of the ingredients need to be maintained. Likewise, the incubation times may vary depending on the fungus species being incubated and the fruit that has been targeted for production. Other fermentation modifications may be made on this generalized base of information.

Example 5. Unexpected Effect of Truffle-Infusion with Food Ingredients Having Sulfur-Containing Compounds Plant species known to possess sulfur-containing compounds to make pastes: These have been used as a food base in truffle fungi fermentation to make new food products. The rationale is that the truffle fungi are tasty because of the sulfur containing ingredients that they contain and that they are able to metabolize biochemicals containing sulfur. Thus, the prospect exists that plants known to contain sulfur based biochemicals may be metabolized by the truffle fungi to yield still other sulfur modified compounds that would add new substances with novel flavors. Thus, virtually all of the mustard family (brassicas) contain sulfur-based biochemicals, and some examples are mustard (above made into a powder), watercress, turnip, kohlrabi, Brussel sprouts and many others) and the potent tastes of garlic and onions (Amaryllidaceae family) also are attributed to such compounds. Thus, the truffle fungi especially the white and black truffle isolates were incubated with some of these plant containing sulfur compounds to determine if novel taste patterns can emerge.

In one case, for example, harvested, washed and cleaned garlic roots were used as the plant source of the fermentation base for the truffle fungi. Again, the volume of plant material to the volume of water used and the amount of growth formula used was as described for the grain fermentations with appropriate modifications of the free liquid volume that was added. Generally, the time of incubation with the white truffle fungus was 3 weeks and for the black truffle it was longer—6 to 8 weeks. The harvested products were dried to a paste at 70-71° C. and they possessed a taste that was sweet with both garlic and truffle tasting qualities. The paste was mixed with butter to garlic paste at a vol:vol basis at 1:2 ratio to make a wonderful bread or food spread having a mixture of unique truffle/garlic flavors. Similar mixes could be made with tomato sauce, sour cream, or cream cheese to make unique flavor enhancing combinations for dips or spreads and the suggested ratio is about 1 vol to 1 vol of each. Onions, leeks, shallots, chives and scallions plus a variety of garlic genetic selections are potential targets for product development using these techniques and truffle fungi following these procedures.

Example 6. Exemplary Truffle Infusion Products

Olive oil: 0.5-1% by weight truffle powder described herein in the olive oil.

Salt: 1-10% by weight truffle powder described herein in the salt.

Sauces, generally, such as tomato sauce or hot sauce: 0.5-1.5% by weight truffle powder described herein in the sauce;

Tomato sauce: 1:1 volume ratio of truffle/garlic paste to tomato sauce to introduce truffle flavor to the sauce. The amount of the truffle paste can be increased to taste.

Coffee: 8-9:1 weight ratio of regular coffee to truffle/coffee powder, where the truffle/coffee powder is a truffle infusion produced from incubating coffee berries or roasted coffee beans with the pure culture of truffle fungus. The coffee mixture can then be brewed regularly.

Mustard sauce: use truffle/mustard seed powder in lieu of mustard seed to prepare mustard sauce based a conventional sauce recipe.

Honey: 2-3 volume truffle paste described herein for 7-8 volume of honey. Truffle paste produced from a tree nut produces the most favorable flavor.

Garlic butter: 1:2 volume ratio of truffle/garlic paste to butter.

Seasoned dip or herbed cream cheese: 1:1 volume ratio of truffle/seasoning paste to sour cream or cream cheese. The seasoning ingredient incubated with the pure culture of truffle fungus to produce the truffle/seasoning paste is from the Amaryllidaceae family, such as garlic, onion, chive, shallot, or scallion.

Example 7. Storage of Isolated Truffle Species

One critical requirement for the domestication of truffle fungi is the ability to successfully store them for recovery and future use. Many techniques are available for this purpose and several of the standard procedures were tested. The isolated truffle species were tested and the techniques described below resulted in successful storage of these isolated cultures.

1. Storage in Sterile Water at Refrigerator Temperatures.

Two- to three-week-old cultures of each of the truffle fungi, growing on PDA potato dextrose agar, had the surface of the agar plate scraped with a bacterial loop. The spores and hyphal fragments picked up by the loop were then placed by shaking into a small vial containing about 1 ml of sterile distilled water. The vial was then capped and placed at 3° C. for various time periods. Subsequently, a loop was reinserted into the spore suspension and spread over the surface of a freshly prepared plate of PDA. The isolates of *T. melanosporum* and *T. borchii* showed growth on the plates within 2 days after having been stored for over 1 year. The isolates of *T. aestivum, T. magnatum, T. uncinatum* and *Imaia* spp. all showed positive growth after storage for 3 months and even up to 1 year. This technique is a promising one for keeping viable cultures of the truffle fungi.

2. Storage of infested grains at −80° C.

Once a truffle fungus has been growing on PDA for several weeks, a group of 20-30 sterile (autoclaved) barley or rice seeds were placed on the agar surface over the growing fungal culture which allowed the seeds to become infested with the fungus. The seeds had been prepared by adding water at 1 volume seeds to 1 volume water and then autoclaved followed by cooling and re-autoclaving with the addition of 0.5 vol water to 1 vol of grain. Two cycles of autoclaving were needed to destroy the spore forming bacteria commonly associated with them. The sterilized grains were incubated on the truffle fungus infested plate for two to three weeks and then placed in cryo-vials, appropriately labeled, at −80° C. for extended periods. The tested truffle fungi were readily recovered from this storage condition for a minimum of 1 year after placement at this storage temperature.

3. Storage of Infested Dried Grain at 22° C.

The infested seeds, above as outlined, instead of being placed at −80° C. were simply removed from the PDA plate and placed in an empty plastic Petri plate and allowed to dry at 22° C. The plates were then wrapped with parafilm and stored at 22° C.

Intermittently, seeds were removed and placed on regular PDA to check for fungal viability. Each of the tested truffle fungi could withstand drying and storage at room temperature for at least one year or longer.

Other observations on the storage and durability of the truffle fungi at various temperatures revealed the following:

a. Infested seeds can also be stored at −18 to −20° C. and the fungi remain viable for extended periods. They also remain viable if removed from storage, thawed and refrozen.

b. Infested seeds, when placed at −80° C. then removed and thawed and refrozen, also remain viable. This is not a common observation for most fungi as they expire if frozen—thawed—and refrozen.

c. The fungi can stand heat exposures of many minutes of up to 35 to 50° C.

d. The truffle fungi generally expires at 65 to 70° C. with a two-hour exposure.

Ultimately, each of the truffle fungi were grown on sterile barley seeds for several weeks and then these colonized seeds were transferred to cryo-vials and stored at −80° C. and they all can be successfully stored under these conditions for extended periods. They are all successfully stored and preserved in the Montana State University culture collection and in the collection of the Black Boar Truffle Co.

REFERENCES CITED AND INCORPORATED BY REFERENCE

Centre for Food Safety, Gov of Hong Kong. A kind of cheese with truffle suspected to be contaminated with *Listeria monocytogenes*. 2017.

Cirlincione, F., et al., 2021. Microbial Safety of Black Summer Truffle Collected from Sicily and Umbria Regions, Italy. *Journal of Food Quality and Hazards Control* 8 (2021) 13-20.

Cullere, L. et al., 2009. Characterization of aroma active compounds in black truffles (*Tuber melansporum*) and summer truffles (*Tuber aestivum*) by gas chromatography. olfactometry. *Food Chemistry* 122-300-306.

De Aza, C., et al., 2022. Fungal and bacterial communities in *Tuber melanosporum* plantations from northern Spain. *Forests* 13: 385-

Iotti, M. et al., 2002. Morphological and molecular characterization of mycelia of some *Tuber* species in pure culture. New Phytologist 155: 499-505.

Lee, H., Nam, K., Zahra, Z. et al. Potentials of truffles in nutritional and medicinal applications: a review. *Fungal Biol Biotechnol* 7, 9 (2020).

Mitchell, A. M. Strobel, G. A., Moore, E., Robison, R., and Sears, J. 2010 Volatile antimicrobials from Muscodor crispans. *Microbiology* 156: 270-277.

Mustafa, A. M. et al., 2020. An overview of truffle aroma and main volatile compounds. *Molecules.* 25: 5948.

Nowak, Z. 2015. *Truffle: A Global History*. Reaktion Books. 128P.

Saxena, S and Strobel, G. A. 2021. Marvelous Muscodor spp.: update on their biology and applications. *Microbial Ecology* 82: 5-20.

Strobel, G. A., Dirksie, E., Sears, J., and Markworth, C. 2001. Volatile antimicrobials from a Novel Endophytic Fungus. *Microbiol.* 147: 2943-2950.

Urban, A., et al., 2004. Molecular studies on terricolous microfungi reveal novel anamorph of two *Tuber* species. *Mycol. Rev* 108: 749-758.

Vahdatzaheh, M., et al., 2015. The Role of the Microbiome of Truffles in Aroma Formation: A Meta-Analysis Approach. *Appl. Environ. Microbiol.* 81: 6946-6952.

White, T. J. (1990) Amplification and Direct Sequencing of Fungal Ribosomal RNA Genes for Phylogenetics. In: *PCR Protocols, a Guide to Methods and Applications,* 315-322.

We claim:

1. A method of producing a truffle infusion comprising:

combining in a grow bag or other suitable container a pure culture of ascomycetous fungus with fruit, nut, grain, seed or a portion thereof with a peptone solution;

adjusting the pH of the contents of the grow bag or other suitable container to 5.0-7.4;

incubating the grow bag or other suitable container at 19-21° C. for at least three weeks to produce a truffle-infused product; and heating the truffle-infused product to inactivate the ascomycetous fungus thereby producing a truffle mash, paste, or powder, wherein the pure culture of ascomycetous fungus is obtained by:

obtaining a spore-producing fruiting body of an ascomycetous fungus from soil;

scraping the inside of the spore-producing fruiting body of the ascomycetous fungus to a collect a fruiting body sample, placing the fruiting body sample on a first surface comprising a nutrient substrate, wherein the nutrient substrate comprises:

a simple sugar;

a botanical isolate; and agar;

incubating the fruiting body sample on the nutrient substrate with an antimicrobial volatile mixture until mycelium formation, wherein the presence of mycelium indicates new fungal growth; and transferring the new fungal growth into a second surface comprising the nutrient substrate to obtain the pure culture of the ascomycetous fungus.

2. The method of claim 1, wherein the pure culture of ascomycetous fungus is combined with nut, grain, seed, or a portion thereof, the solution further comprises a simple sugar and yeast extract.

3. The method of claim 2, wherein the volume of the solution is 0.5-1.0 L for a volume of 1-2 L of the nut, grain, seed, or portion thereof.

4. The method of claim 2, wherein the solution comprises 5 g simple sugar, 1 g peptone, and 2 g yeast extract.

5. The method of claim 2, wherein the solution comprises the simple sugar, the peptone, and the yeast extract at a weight ratio of 5:1:2 (simple sugar:peptone:yeast extract).

6. The method of claim 1, wherein the pure culture of ascomycetous fungus is combined with fruit or a portion thereof, and the solution does not comprise yeast extract.

7. The method of claim 6, wherein the solution does not comprise any amount of a simple sugar in addition to the simple sugar inherently present in the fruit or portion thereof.

8. The method of claim 1, wherein the pH of the contents of the grow bags or other suitable container is adjusted to 6.0 to 6.5 or about 6.0.

9. The method of claim 1, wherein the truffle-infused product is heated to at least 70° C. to inactivate the ascomycetous fungus.

10. A method of generating a new taste profile in food/ingredient comprising sulfur-containing compounds comprising:

combining in a grow bag a pure culture of ascomycetous fungus with the food/ingredient comprising sulfur-containing compounds with a solution, the solution comprising peptone;

adjusting the pH of the contents of the grow bag to 5.0 to 7.4; and incubating the growth bag at 19-21° C. for at least three weeks to produce the new taste profile in the food/ingredient comprising sulfur-containing compounds wherein the pure culture of ascomycetous fungus is obtained by:

obtaining a spore-producing fruiting body of an ascomycetous fungus from soil;

scraping the inside of the spore-producing fruiting body of the ascomycetous fungus to collect a fruiting body sample, placing the fruiting body sample on a first surface comprising a nutrient substrate, wherein the nutrient substrate comprises:

a simple sugar;

a botanical isolate;

and agar;

incubating the fruiting body sample on the nutrient substrate with an antimicrobial volatile mixture until mycelium formation, wherein the presence of mycelium indicates new fungal growth; and transferring the new fungal growth into a second surface comprising the nutrient substrate to obtain the pure culture of the ascomycetous fungus.

11. The method of claim 10, wherein the solution further comprises a simple sugar and yeast extract.

12. The method of claim 11, wherein the food/ingredient comprising sulfur-containing compounds is selected from the group consisting of: mustard, watercress, turnip, kohlrabi, Brussel sprout, garlic, onion, chive, leek, shallot, scallion, and a portion thereof.

13. The method of claim 1, wherein pH is adjusted with a phosphate buffer.

14. The method of claim 13, wherein the phosphate buffer comprises $KH_2PO_4$ and $K_2\,HPO_4$ at a molar ratio of 9:1.

15. The method of claim 1, wherein the ascomycetous fungus comprises a *Tuber* spp. and *Iamai* spp.

16. The method of claim 15, wherein the ascomycetous fungus is selected from a group consisting of: *Tuber melanosporum, Tuber magnatum, Tuber aestivum, Tuber uncinatum, Tuber borchii, Imaia* spp., *Tuber macrosporum, Tuber gibbosum, Tuber oregonense*, and *Tuber lyonii* syn. *Texense.*

* * * * *